(12) United States Patent
Takahashi et al.

(10) Patent No.: US 10,917,670 B2
(45) Date of Patent: Feb. 9, 2021

(54) DATA PROCESSING DEVICE AND DATA PROCESSING METHOD

(71) Applicant: SONY SEMICONDUCTOR SOLUTIONS CORPORATION, Atsugi (JP)

(72) Inventors: Kazuyuki Takahashi, Chiba (JP); Yuichi Hirayama, Chiba (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 141 days.

(21) Appl. No.: 16/307,639

(22) PCT Filed: Jul. 14, 2017

(86) PCT No.: PCT/JP2017/025728
§ 371 (c)(1),
(2) Date: Dec. 6, 2018

(87) PCT Pub. No.: WO2018/021072
PCT Pub. Date: Feb. 1, 2018

(65) Prior Publication Data
US 2019/0306542 A1    Oct. 3, 2019

(30) Foreign Application Priority Data
Jul. 29, 2016  (JP) .................. 2016-150352

(51) Int. Cl.
*H04N 7/10*   (2006.01)
*H04N 7/025*  (2006.01)
(Continued)

(52) U.S. Cl.
CPC .......... *H04N 21/235* (2013.01); *H04H 20/59* (2013.01); *H04H 60/73* (2013.01); *H04N 21/236* (2013.01);
(Continued)

(58) Field of Classification Search
CPC .. H04N 21/235; H04N 21/236; H04N 21/434; H04N 21/6112; H04N 21/64322;
(Continued)

(56) References Cited

U.S. PATENT DOCUMENTS 10,271,110 B2 *  4/2019  Kitahara .......... H04N 21/41415
2006/0110129 A1 *  5/2006  Hamada ............... H04N 21/435
                                                          386/260
(Continued)

FOREIGN PATENT DOCUMENTS

CN    106797489 A    5/2017
EP    1 956 765 A1   8/2008
(Continued)

OTHER PUBLICATIONS

International Search Report dated Oct. 10, 2017 in PCT/JP2017/025728 filed on Jul. 14, 2017.
(Continued)

*Primary Examiner* — Kyu Chae
(74) *Attorney, Agent, or Firm* — Oblon, McClelland, Maier & Neustadt, L.L.P.

(57) ABSTRACT

The present technology relates to a data processing device and a data processing method that can realize further flexible operation of digital television broadcasting.
A data processing device placed in a facility related to broadcasting station and a data processing device placed in a transmitter station exchange data, as transmission data transmitted via a communication line, which is obtained by processing a stream including control information, a component, and variable-length information and adding variable-length information existence information indicating a presence or absence of variable-length information. The present technology can be applied as a transmission system
(Continued)

between stations, for example, between a broadcasting station and a transmitter station.

16 Claims, 21 Drawing Sheets

(51) Int. Cl.
| | |
|---|---|
| *H04N 7/173* | (2011.01) |
| *H04N 7/16* | (2011.01) |
| *H04N 21/235* | (2011.01) |
| *H04N 21/236* | (2011.01) |
| *H04N 21/434* | (2011.01) |
| *H04N 21/61* | (2011.01) |
| *H04N 21/643* | (2011.01) |
| *H04H 60/73* | (2008.01) |
| *H04H 20/59* | (2008.01) |
| *H04N 21/81* | (2011.01) |
| *H04L 27/26* | (2006.01) |

(52) U.S. Cl.
CPC ....... *H04N 21/434* (2013.01); *H04N 21/6112* (2013.01); *H04N 21/64322* (2013.01); *H04N 21/814* (2013.01); *H04L 27/2602* (2013.01)

(58) Field of Classification Search
CPC ...... H04N 21/814; H04H 20/59; H04H 60/73; H04L 27/2602
See application file for complete search history.

(56) References Cited

U.S. PATENT DOCUMENTS

| | | | |
|---|---|---|---|
| 2009/0303911 A1 | 12/2009 | Kimura et al. | |
| 2010/0031284 A1* | 2/2010 | Miyaki | H04N 21/25841 725/32 |
| 2011/0247086 A1* | 10/2011 | Ohno | H04N 21/43615 726/31 |
| 2012/0195252 A1* | 8/2012 | Suga | H04B 7/15528 370/315 |
| 2015/0052551 A1* | 2/2015 | Toge | H04N 21/814 725/33 |
| 2016/0087736 A1 | 3/2016 | Murakami et al. | |
| 2017/0207869 A1* | 7/2017 | Iguchi | H04H 20/95 |

FOREIGN PATENT DOCUMENTS

| | | |
|---|---|---|
| EP | 3 010 189 A1 | 4/2016 |
| JP | 2014-33331 A | 2/2014 |
| JP | 2016-82582 A | 5/2016 |
| WO | WO 2014/199633 A1 | 12/2014 |
| WO | WO 2016/056201 A1 | 4/2016 |

OTHER PUBLICATIONS

Ay Aoki, S., "International Standardization of New Media Transport Method", NHK Science and Technical Research Laboratories R&D Report [online], Mar. 2015, 23 pages. [retrieval date Sep. 28, 2017], InternetURL:http://www.nhk.or.ip/strl/publica/rd/rd150/PDF/P12-22.pdf (with translation).

Combined Chinese Office Action and Search Report dated Mar. 12, 2020 in corresponding Chinese Patent Application No. 201780045542.2 (with English Translation), 19 pages.

"Transmission System for Digital Terrestrial Television Broadcasting", ARIB Standard, ARIB STD-B31, Version 2.2-E1, Mar. 18, 2014, 419 pages (with English Translation).

Extended European Search Report dated Apr. 4, 2019 in European Patent Application No. 17834080.8, 9 pages.

\* cited by examiner

FIG. 7

| DESTINATION MAC ADDRESS | TRANSMISSION SOURCE MAC ADDRESS | PROTOCOL TYPE | PROTOCOL SUBTYPE | PROTOCOL VERSION | IPv4 HEADER | UDP HEADER | DATA | TMCC | EMERGENCY WARNING INFORMATION | FCS |

FIG. 8

| Syntax | No of bits | Semantics |
|---|---|---|
| TLV_packet { | | |
| Protocol_Type | 16 | PROTOCOL TYPE (To be defined in IEEE) |
| Protocol_Subtype | 16 | PROTOCOL SUBTYPE |
| Protocol_Version | 8 | PROTOCOL VERSION |
| LEN_DATA_Packet | 16 | DATA PACKET LENGTH |
| DATA_Packet | var | DATA PACKET |
| TMCC | var | TMCC INFORMATION |
| EA_info | var | EMERGENCY WARNING INFORMATION |
| } | | |

FIG. 9

| Syntax | bit | Semantics |
|---|---|---|
| Protocol_Subtype | 15-6 | RESERVED FOR FUTURE USE |
| | 5 | PRESENCE OR ABSENCE OF EMERGENCY WARNING INFORMATION (1: EMERGENCY WARNING INFORMATION IS INCLUDED, 0: EMERGENCY WARNING INFORMATION IS NOT INCLUDED) |
| | 4 | PRESENCE OR ABSENCE OF TMCC INFORMATION (1: TMCC INFORMATION IS INCLUDED, 0: TMCC INFORMATION IS NOT INCLUDED) |
| | 3 | PRESENCE OR ABSENCE OF DATA PACKET (1: DATA PACKET IS INCLUDED, 0: DATA PACKET IS NOT INCLUDED) |
| | 2-0 | DATA TYPE (0: MPEG2-TS, 1: TLV/MMT, 2-7: RESERVED FOR FUTURE USE) |

FIG. 10

| Syntax | No of Bits | Mnemonic | Semantics |
|---|---|---|---|
| LEN_TMCC | 8 | uimsbf | LENGTH OF TMCC |
| LEN_TMCC_Parity | 8 | uimsbf | LENGTH OF TMCC_Parity |
| Parity | 16 | uimsbf | PARITY OF LEN_TMCC AND LEN_TMCC_Parity |
| NUM_LAYER | 6 | uimsbf | NUMBER OF LAYERS (IN CASE OF 64 LAYERS AT MAXIMUM) |
| for(i=0;i<NUM_LAYER;i++){ | | | |
| num_segment | 6 | uimsbf | NUMBER OF SEGMENTS OF LAYER |
| layer_fft_size | 2 | uimsbf | FFT SIZE |
| layer_mod | 3 | uimsbf | CARRIER MODULATION SYSTEM |
| layer_cod | 3 | uimsbf | CODE RATE OF ERROR CORRECTION |
| layer_gi | 3 | uimsbf | GUARD INTERVAL |
| packet_type | 3 | uimsbf | TRANSMITTED DATA TYPE |
| } | | | |
| TMCC_Parity | var | bslbf | PARITY |

FIG. 11

| layer_fft_size | FFT Size |
|---|---|
| 0 | 8K |
| 1 | 16K |
| 2 | 32K |
| 3 | reserved |

FIG. 12

| layer_mod | Modulation |
|---|---|
| 0 | QPSK |
| 1 | 16QAM |
| 2 | 64QAM-NUC |
| 3 | 256QAM-NUC |
| 4 | 1024QAM-NUC |
| 5 | 4096QAM-NUC |
| 6..7 | Reserved |

FIG. 13

| layer_cod | Code Rate |
|---|---|
| 0 | 1/2 |
| 1 | 2/3 |
| 2 | 3/4 |
| 3 | 5/6 |
| 4 | 7/8 |
| 5..7 | Reserved |

FIG. 14

| layer_gi | Guard Interval |
|---|---|
| 0 | 1/4 |
| 1 | 1/8 |
| 2 | 1/16 |
| 3 | 1/32 |
| 4..7 | Reserved |

FIG. 15

| packet_type | DATA TYPE |
|---|---|
| 0 | MPEG2-TS |
| 1 | TLV/MMT |
| 2..7 | Reserved |

FIG. 16

| Syntax | No of Bits | Mnemonic | Semantics |
|---|---|---|---|
| LEN_EA_info | 8 | uimsbf | LENGTH OF EA_info |
| LEN_EA_Parity | 8 | uimsbf | LENGTH OF EA_info_Parity |
| Parity | 16 | uimsbf | PARITY OF EA_info AND EA_info_Parity |
| EA_EXIST_FLAG | 1 | bslbf | FLAG INDICATING THAT THERE IS INFORMATION |
| if(EA_EXIST_FLAG) { | | | |
| version | 8 | uimsbf | VERSION OF EMERGENCY WARNING INFORMATION |
| NUM_EA_MESSAGE | 8 | bslbf | NUMBER OF DISASTER CLASS CODES |
| for (i=0;i<NUM_EA_MESSAGE;i++) { | | | |
| EA_code | 8 | uimsbf | DISASTER CLASS CODE |
| EA_status | 2 | uimsbf | STATE OF EMERGENCY WARNING |
| location_type | 3 | bslbf | TYPE OF AREA CODE |
| location_length | var | bslbf | LENGTH OF AREA CODE |
| location_code | var | uimsbf | AREA CODE |
| } | | | |
| } | | | |
| EA_Parity | var | bslbf | PARITY |

FIG. 17

| EA_code (DISASTER CLASS CODE) | EA_message_data (EMERGENCY WARNING INFORMATION) |
|---|---|
| 0 | EARTHQUAKE HAS OCCURRED. BE PREPARED FOR FIERCE SHAKING. |
| 1 | FIERCE SHAKING IS COMING IN ONE SECOND. |
| 2 | FIERCE SHAKING IS COMING IN TWO SECONDS. |
| 3 | FIERCE SHAKING IS COMING IN THREE SECONDS. |
| 4 | FIERCE SHAKING IS COMING IN FOUR SECONDS. |
| 5 | FIERCE SHAKING IS COMING IN FIVE SECONDS. |
| 6 | HEAVY RAIN EXCEEDING 30 MILLIMETERS IS EXPECTED. |
| 7 | HEAVY RAIN EXCEEDING 30 MILLIMETERS IS EXPECTED 10 MINUTES LATER. |
| 8 | HEAVY RAIN EXCEEDING 30 MILLIMETERS IS EXPECTED 15 MINUTES LATER. |
| 9 | HEAVY RAIN EXCEEDING 30 MILLIMETERS IS EXPECTED 20 MINUTES LATER. |
| ... | |

FIG. 18

| EA_status | STATE OF EMERGENCY WARNING |
|---|---|
| 0 | EMERGENCY WARNING STARTS |
| 1 | ONGOING |
| 2 | END |
| 3 | RESERVED FOR FUTURE USE |

FIG. 19

| location_type | MEANING OF VALUE | NUMBER OF BITS OF location_length | NUMBER OF BITS OF location_code |
|---|---|---|---|
| 0 | NATIONWIDE | - | - |
| 1 | PRESET PREFECTURE CODE | 0bit (NOT NEEDED, SINCE location_code IS ALWAYS 8 BITS) | 8bits |
| 2 | POSTAL CODE | 3bits (1 TO 7 DIGITS) | 7 DIGITS x 4bits = 28bits AT MAXIMUM (EXAMPLE: 141-0000) |
| 3 | LATITUDE/LONGITUDE COORDINATE SPECIFICATION | 4bits (1 TO 9 DIGITS) | 9 DIGITS x 4bits x 2 (LATITUDE, LONGITUDE) x 2(START, END) = 144bits AT MAXIMUM (EXAMPLE: 035.427293, 139.360740) |
| 4-7 | RESERVED FOR FUTURE USER | - | - |

FIG. 20

JAPANESE PREFECTURE JIS CODES (JIS X0401)

| | | | | |
|---|---|---|---|---|
| 1 | HOKKAIDO | 17 | ISHIKAWA-KEN | |
| 2 | AOMORI-KEN | 18 | FUKUI-KEN | |
| 3 | IWATE-KEN | 19 | YAMANASHI-KEN | |
| 4 | MIYAGI-KEN | 20 | NAGANO-KEN | |
| 5 | AKITA-KEN | 21 | GIFU-KEN | |
| 6 | YAMAGATA-KEN | 22 | SHIZUOKA-KEN | |
| 7 | FUKUSHIMA-KEN | 23 | AICHI-KEN | |
| 8 | IBARAKI-KEN | 24 | MIE-KEN | |
| 9 | TOCHIGI-KEN | 25 | SHIGA-KEN | |
| 10 | GUNMA-KEN | 26 | KYOTO-FU | |
| 11 | SAITAMA-KEN | 27 | OSAKA-FU | |
| 12 | CHIBA-KEN | 28 | HYOGO-KEN | |
| 13 | TOKYO-TO | 29 | NARA-KEN | |
| 14 | KANAGAWA-KEN | 30 | WAKAYAMA-KEN | |
| 15 | NIIGATA-KEN | 31 | TOTTORI-KEN | |
| 16 | TOYAMA-KEN | 32 | SHIMANE-KEN | |

| | |
|---|---|
| 33 | OKAYAMA-KEN |
| 34 | HIROSHIMA-KEN |
| 35 | YAMAGUCHI-KEN |
| 36 | TOKUSHIMA-KEN |
| 37 | KAGAWA-KEN |
| 38 | EHIME-KEN |
| 39 | KOCHI-KEN |
| 40 | FUKUOKA-KEN |
| 41 | SAGA-KEN |
| 42 | NAGASAKI-KEN |
| 43 | KUMAMOTO-KEN |
| 44 | OITA-KEN |
| 45 | MIYAZAKI-KEN |
| 46 | KAGOSHIMA-KEN |
| 47 | OKINAWA-KEN |

DATA PROCESSING DEVICE AND DATA PROCESSING METHOD

TECHNICAL FIELD

The present technology relates to a data processing device and a data processing method and, more particularly, relates to a data processing device and a data processing method that can realize more flexible operation of digital television broadcasting.

BACKGROUND ART

For example, in Integrated Services Digital Broadcasting-Terrestrial (ISDB-T) employed in Japan or the like as a broadcasting system of digital terrestrial television broadcasting, transmission multiplexing configuration control (TMCC) is defined as control information of a physical layer (for example, see Non-Patent Document 1).

Furthermore, in advanced wide band digital satellite broadcasting, it is defined that TMCC basic information is transmitted as an inter-station signal between a broadcasting station in the transmitting side and an uplink station, and the uplink station transmits data by using the TMCC basic information (for example, see Non-Patent Document 2).

CITATION LIST

Non-Patent Documents

Non-Patent Document 1: ARIB STD-B31 ver. 2.2, Association of Radio Industries and Businesses
Non-Patent Document 2: NEXTVF TR-0004 Advanced wide band digital satellite broadcasting operation standards ver. 1.1, Next Generation Television 4 Broadcasting Promotion Forum (NexTV-F)

SUMMARY OF THE INVENTION

Problems to be Solved by the Invention

Here, a proposal for more flexible operation between a broadcasting station in a transmitting side and a transmitter station has been requested due to an expansion of a broadcasting system of current digital terrestrial television broadcasting.

The present technology has been made in view of the above situation and provides more flexible operation of digital television broadcasting.

Solutions to Problems

A data processing device according to a first aspect of the present technology includes a processing unit configured to process a stream including first control information, a component, and variable-length information and add variable-length information existence information indicating a presence or an absence of the variable-length information, and a transmitting unit configured to transmit the processed stream as transmission data to another data processing device via a communication line.

The data processing device according to the first aspect of the present technology may be an independent device or an internal block composing a single device. Furthermore, a data processing method according to the first aspect of the present technology is a data processing method compatible with the above described data processing device according to the first aspect of the present technology.

In the data processing device and data processing method according to the first aspect of the present technology, the stream including the first control information, component, and variable-length information is processed, the variable-length information existence information indicating a presence or an absence of the variable-length information is added, and the processed stream is transmitted as transmission data to another data processing device via the communication line.

A data processing device according to a second aspect of the present technology includes a receiving unit configured to receive transmission data transmitted from another data processing device via a communication line, and a processing unit configured to process the transmission data. The transmission data is data obtained by processing a stream including first control information, a component, and variable-length information, and adding variable-length information existence information indicating a presence or an absence of the variable-length information, and the processing unit processes the transmission data on the basis of the variable-length information existence information.

The data processing device according to the second aspect of the present technology may be an independent device or may be an internal block composing a single device. Furthermore, a data processing method according to the second aspect of the present technology is a data processing method compatible with the above described data processing device according to the second aspect of the present technology.

In the data processing device and data processing method according to the second aspect of the present technology, transmission data transmitted from another data processing device is received via the communication line and the transmission data is processed. Furthermore, the transmission data is data obtained by processing the stream including the first control information, component, and variable-length information and adding the variable-length information existence information indicating a presence or an absence of the variable-length information, and the transmission data is processed on the basis of the variable-length information existence information.

Effects of the Invention

According to the first aspect and second aspect of the present technology, digital television broadcasting can be operated more flexibly.

Rote that effects described here should not be limited and there may be any effect described in this disclosure.

BRIEF DESCRIPTION OF DRAWINGS

FIG. 7 is a diagram illustrating an example of a format of transmission data according to the present technology.

FIG. 8 is a diagram illustrating an example of syntax of a TLV packet according to the present technology.

FIG. 9 is a diagram illustrating an example of syntax of a protocol subtype.

FIG. 10 is a diagram illustrating an example of syntax of the TMCC information according to the present technology.

FIG. 11 is a diagram illustrating an example of an FFT size.

FIG. 12 is a diagram illustrating an example of carrier modulation systems.

FIG. 13 is a diagram illustrating an example of code rates of an error correction.

FIG. 14 is a diagram illustrating an example of guard intervals.

FIG. 15 is a diagram illustrating an example of types of data.

FIG. 16 is a diagram illustrating an example of syntax of emergency warning information according to the present technology.

FIG. 17 is a diagram illustrating an example of disaster class codes.

FIG. 18 is a diagram illustrating an example of statuses of emergency warning.

FIG. 19 is a diagram illustrating an example of types of area codes.

FIG. 20 is a diagram illustrating a correspondence relation between prefecture codes defined in JIS X0401 and prefectures indicated by the prefecture codes.

MODE FOR CARRYING OUT THE INVENTION

Figure 1:
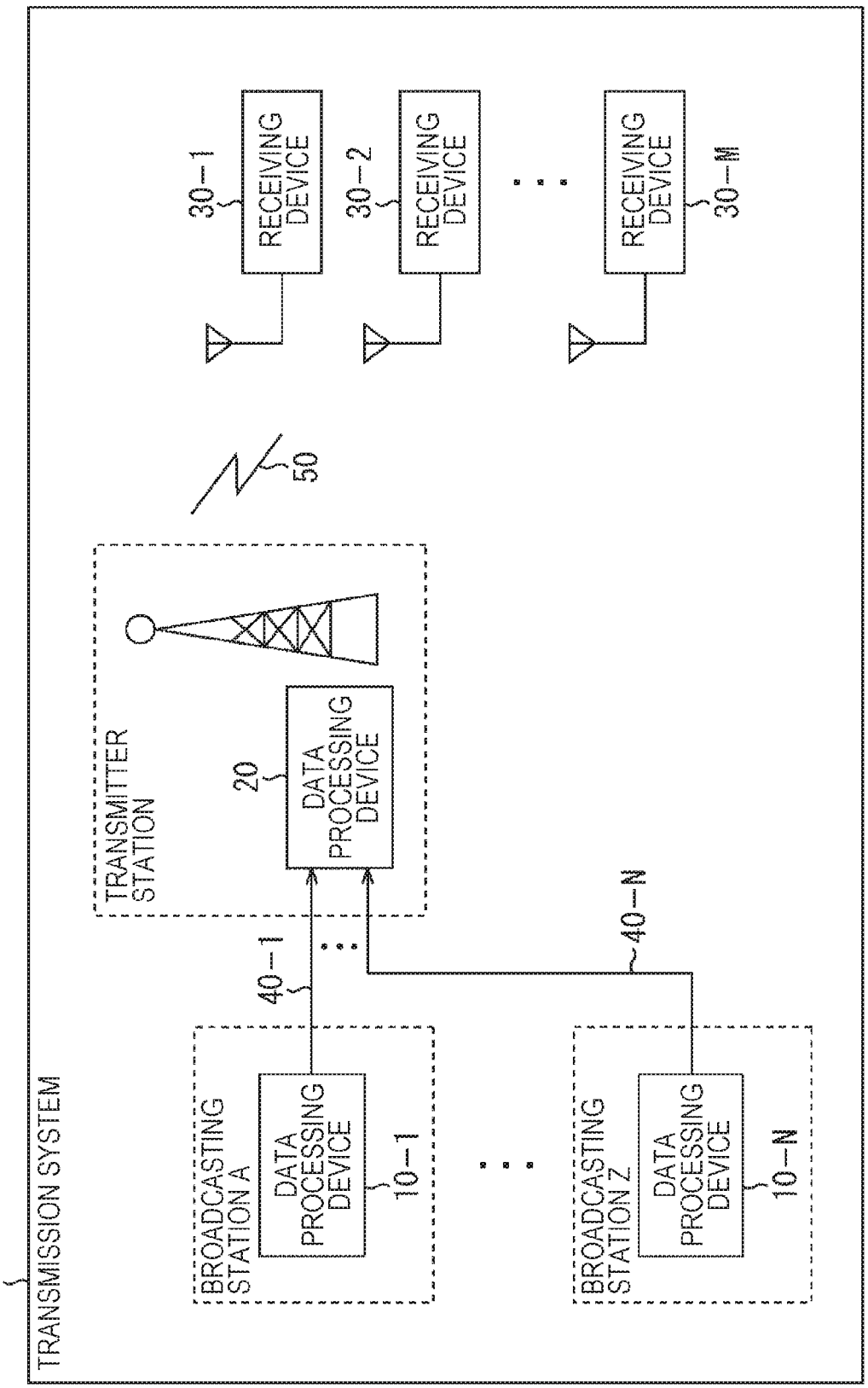
FIG. 1 is a diagram illustrating a configuration of a first embodiment of a transmission system to which the present technology is applied.

Hereinafter, an embodiment of the present technology will be described with reference to the drawings. Note that the description will be given in the following order.

1. System configuration
2. Outline of the present technology
3. Format of transmission data according to the present technology
4. Example of variable-length information according to the present technology
5. Flow of data transmission process between stations according to the present technology
6. Modification example
7. Configuration of computer <1. System Configuration>

(Configuration Example of Transmission System)

FIG. 1 is a diagram illustrating a configuration of a first embodiment of a transmission system to which the present technology is applied. Note that the system represents an aggregation in which a plurality of devices is logically aggregated.

In FIG. 1, the transmission system 1 includes data processing devices 10-1 to 10-N (N is an integral number which is equal to or greater than one) provided in respective facilities related to each broadcasting station, a data processing device 20 provided in a transmitter station, and receiving devices 30-1 to 30-M (M is an integral number which is equal to or greater than one) of end users.

Furthermore, in the transmission system 1, the data processing devices 10-1 to 10-N and the data processing device 20 are connected via communication lines 40-1 to 40-N. Note that the communication lines 40-1 to 40-N may be exclusive lines, for example.

The data processing device 10-1 processes content of a broadcast program or the like produced by a broadcasting station A and transmits transmission data obtained as a result to the data processing device 20 via the communication line 40-1.

In the data processing devices 10-2 to 10-N, as is the case with the data processing device 10-1, content of a broadcast program produced by each broadcasting station such as a broadcasting station B, a broadcasting station 2, and the like is processed and transmission data obtained as a result is transmitted to the data processing device 20 via the communication lines 40-2 to 40-N.

The data processing device 20 receives the transmission data transmitted from the data processing devices 10-1 to 10-N in the broadcasting station side via the communication lines 40-1 to 40-N. The data processing device 20 processes the transmission data from the data processing devices 10-1 to 10-N and transmits a broadcast signal obtained as the result via a transmitting antenna provided in the transmitter station.

With this arrangement, the broadcast signal from the data processing device 20 in the transmitter station side is transmitted to the receiving devices 30-1 to 30-M via a broadcast transmission line 50.

The receiving devices 30-1 to 30-M are fixed receivers such as a television set, a set top box (STB), a recorder, and a network storage, or mobile receivers such as a smartphone, a cell phone, and a tablet computer. Furthermore, the receiving devices 30-1 to 30-M may be devices mounted in a vehicle, such as a vehicle-mounted television set, for example.

The receiving device 30-1 receives a broadcast signal transmitted from the data processing device 20 via the broadcast transmission line 50, processes the signal, and reproduces content such as a broadcast program according to a channel selection operation by an end user.

In the receiving devices 30-2 to 30-M, as is the case with the receiving device 30-1, a broadcast signal from the data processing device 20 is processed and content according to a channel selection operation by an end user is reproduced.

Note that, in the transmission system 1, the broadcast transmission line 50 may be satellite broadcasting using broadcasting satellite (BS) or communications satellite (CS), common antenna television (CATV) using a cable, or the like, in addition to terrestrial wave (terrestrial broadcast), for example.

Furthermore, in the following description, the data processing devices 10-1 to 10-N in the broadcasting station side are referred to as data processing devices 10 in a case where they are not needed to be particularly distinguished, and the communication lines 40-1 to 40-N are referred to as communication lines 40 in a case where they are not needed to be particularly distinguished. Furthermore, the receiving devices 30-1 to 30-2 are referred to as receiving devices 30 in a case where they are not needed to be particularly distinguished.

(Configuration Example of Data Processing Device in Broadcasting Station Side)

Figure 2:
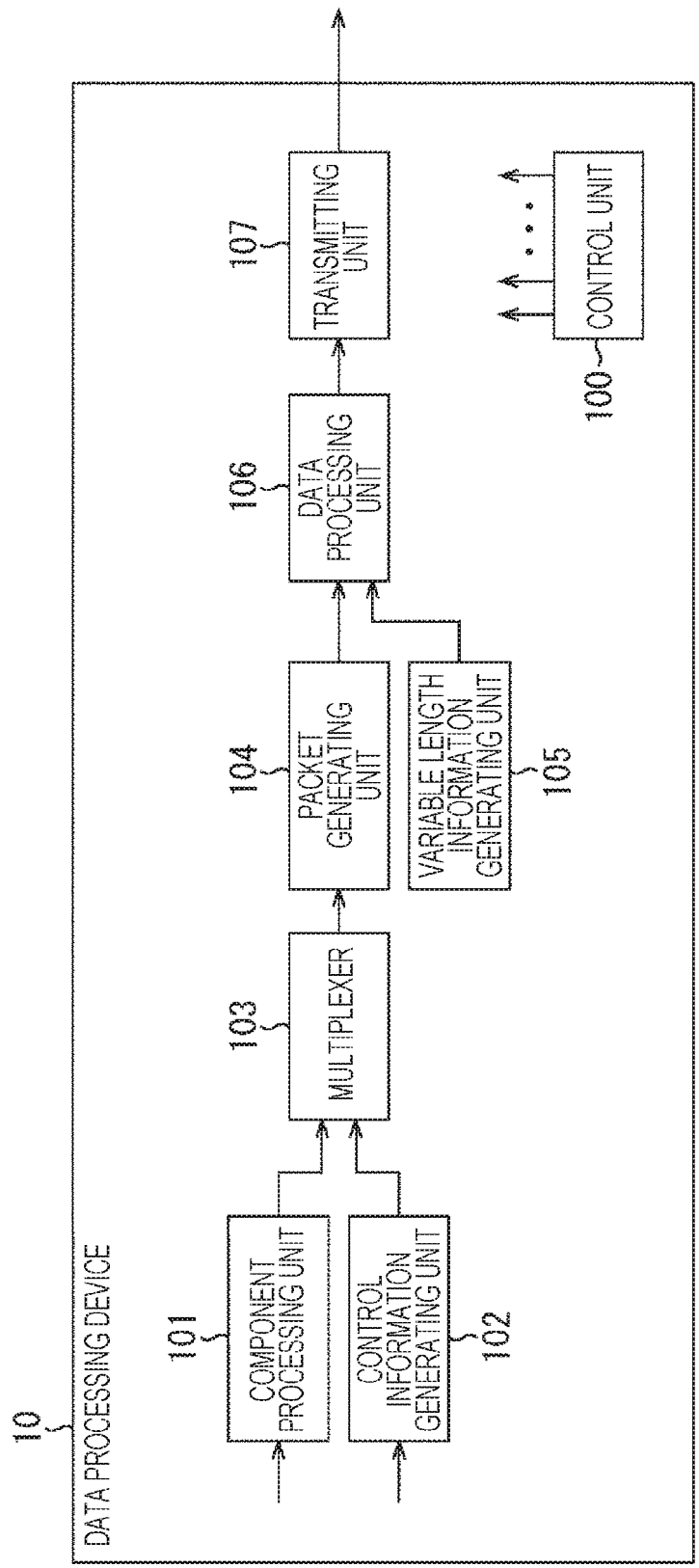
FIG. 2 is a diagram illustrating a configuration example of a data processing device in a broadcasting station side.

FIG. 2 is a diagram illustrating a configuration example of the data processing device 10 in the broadcasting station side illustrated in FIG. 1.

In FIG. 2, the data processing device 10 includes a control unit 100, a component processing unit 101, a control information generating unit 102, a multiplexer 103, a packet generating unit 104, a variable length information generating unit 105, a data processing unit 106, and a transmitting unit 107.

The control unit 100 includes a central processing unit (CPU), a microprocessor, and the like, for example. The control unit 100 controls operation of each unit in the data processing device 10.

The component processing unit 101 processes data of a component that composes content and supplies, to the multiplexer 103, a stream of the component obtained as a result. Here, the data of the component is, for example, data of video, audio, captions, and the like, and, on these pieces of data, a process such as an encoding process compatible with a predetermined encoding system is performed for example.

The control information generating unit 102 generates control information (control information of an upper layer) used in a process for selecting or reproducing content or the like and supplies the control information to the multiplexer 103.

Note that, in the following description, the control information (signaling) is distinguished by referring control information used in a process of a physical layer as "physical layer control information" and control information used in a process of an upper layer, which is an upper layer of the physical layer, as "upper layer control information."

The multiplexer 103 multiplexes a stream of a component supplied from the component processing unit 101 and a stream of the control information of the upper layer supplied from the control information generating unit 102 and supplies a multiplexed stream obtained as a result to the packet generating unit 104. Note that, in this case, another stream such as an application and time information may be multiplexed.

The packet generating unit 104 processes the multiplexed stream supplied from the multiplexer 103, generates a packet (frame) in a predetermined format, and supplies the packet to the data processing unit 106. In this case, for example, the multiplexed stream is encapsulated in a packet of a format such as User Datagram Protocol (UDP), Internet Protocol (IP), and type length value (TLV).

The variable length information generating unit 105 generates variable-length information and supplies the information to the data processing unit 106. In this case, as the variable-length information, physical layer control information, emergency warning information, or the like may be generated, for example. Note that details of the variable-length information such as the physical layer control information or emergency warning information will be described later with reference to FIGS. 10 to 22.

The data processing unit 106 processes a packet (frame) in a predetermined format, which is supplied from the packet generating unit 104, and the variable-length information supplied from the variable length information generating unit 105, generates transmission data, and supplies the transmission data to the transmitting unit 107. Note that details of the transmission data will be described later with reference to FIGS. 7 to 9.

The transmitting unit 107 includes a communication I/F circuit or the like, for example. The transmitting unit 107 transmits the transmission data supplied from the data processing unit 106 to the data processing device 20 in the transmitter station side via the communication line 40.

The data processing device 10 in the broadcasting station side is composed as described above.

(Configuration Example of Data Processing Device in Transmitter Station Side)

Figure 3:
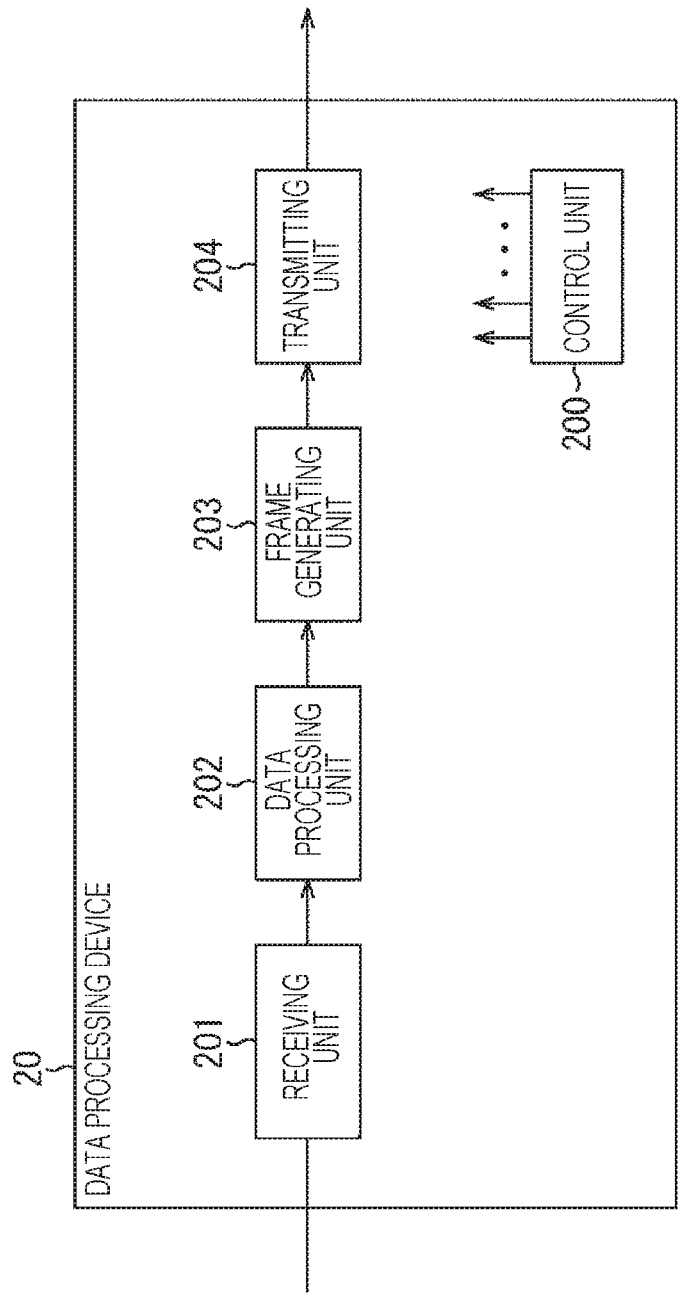
FIG. 3 is a diagram illustrating a configuration example of a data processing device in a transmitter station side.

FIG. 3 is a diagram illustrating a configuration example of the data processing device 20 in the transmitter station side illustrated in FIG. 1.

In FIG. 3, the data processing device 20 includes a control unit 200, a receiving unit 201, a data processing unit 202, a frame generating unit 203, and a transmitting unit 204.

The control unit 200 includes a CPU, a microprocessor, or the like for example. The control unit 200 controls operation of each unit in the data processing device 20.

The receiving unit 201 includes a communication I/F circuit or the like for example. The receiving unit 201 receives, via the communication line 40, transmission data transmitted from the data processing device 10 in the broadcasting station side and supplies the transmission data to the data processing unit 202.

The data processing unit 202 processes the transmission data supplied from the receiving unit 201 and supplies a packet (frame) in a predetermined format obtained as a result and variable-length information such as physical layer control information and emergency warning information to the frame generating unit 203.

The frame generating unit 203 generates a frame of the physical layer (physical layer frame) compatible with a predetermined broadcast system by processing the packet (frame) in the predetermined format and the variable-length information such as physical layer control information or emergency warning information, which are supplied from the data processing unit 202, and supplies the physical layer frame to the transmitting unit 204.

The transmitting unit 204 performs a necessary process of the physical layer frame supplied from the frame generating unit 203 and transmits a broadcast signal obtained as a result via the transmitting antenna provided in the transmitter station. Note that, as the necessary process here, for example, an inverse fast Fourier transform (IFFT) calculation process, a guard interval (GI) addition process, a frequency conversion process, and the like are performed.

The data processing device 20 in the transmitter station side is composed as described above.

<2. Outline of the Present Technology>

Meanwhile, in Japan, as a system of digital terrestrial television broadcasting, ISDB-T has been employed (for example, see above Non-Patent Document 1).

In ISDB-T, high-definition broadcasting using twelve segments, which is mainly for fixed receivers, and "one-segment part reception service for cell phones and mobile terminals" (one-segment broadcasting) using one segment, which is mainly for mobile receivers, are defined.

On the other hand, in Japan, sophistication of the digital terrestrial television broadcasting aiming for a next generation has been considered (hereinafter, standards of this consideration of the sophistication is also referred to as "ISDB-T2").

In the current ISDB-T, frequency division multiplexing (FDM) is used as a method for multiplexing broadcast signals and, in ISDB-T2 for a next generation, it is assumed that frequency division multiplexing (FDM) is also used in a similar manner.

In a case where the frequency division multiplexing (FDM) is used, a predetermined frequency band (6 MHz, for example) is frequency-divided into a plurality of segments and layered transmission using a band for one or more segments is performed. In this case, data of different service, for example, can be transmitted in each layer including a frequency band of one or more segments, which is obtained by frequency-dividing.

In other words, each layer is a unit of a collection of one or more segments. Note that, in ISDB-T, an OFDM segment is used. Here, in Orthogonal Frequency Division Multiplexing (OFDM), a large number of orthogonal subcarriers are provided in a transmission band, and digital modulation is performed.

Furthermore, in ISDB-T2 for the next generation, it is planed that transmission multiplexing configuration control (TMCC) is defined as control information (signaling) of a new physical layer, as is the case of current ISDB-T. The TMCC information is transmission control information to perform a demodulation process, a decoding process, or the like in the receiving device 30 in the layered transmission in which a plurality of transmission parameters (modulation parameters) exists.

Furthermore, in the current ISDB-T, an MPEG2-Transport Stream (TS) system, which has been widely used, is employed as a transmission scheme and, in ISDB-T2 of the next generation, it is expected that more advanced service can be provided by introducing an IP system in which an Internet Protocol (IP) packet used in the communication field is applied to the digital television broadcasting in order to coordinate broadcasting and communication.

In a case where the IP system is employed, it is assumed that a type length value (TLV) packet for transmitting an IP packet including a UDP packet (UDP/IP packet) via the broadcast transmission line 50 are used. The TLV packet is a variable-length packet and is in a size of 4 to 65536 bytes, for example. The TLV packet stores the UDP/IP packet.

Furthermore, in a case where the IP system is employed, it is assumed that MPEG media transport (MMT) for transmitting multimedia content by using various networks including broadcasting and communication, and the like is used as a media transport system.

In other words, by using the MMT, data such as video, audio, captions, upper layer control information, application, and content is stored in the UDP/IP packet, the UDP/IP packet is encapsulated to a TLV packet, and the TLV stream obtained as a result is transmitted as a broadcast wave. Hereinafter, a system using the MMT as a transport protocol of such an IP system is also referred to as a TLV/MMT system.

Note that, the media transport system using the MMT is defined in the following Non-Patent Document 3, for example. In Non-Patent Document 3, as the upper layer control information, control information (signaling information: SI) of two kinds including TLV-SI and MMT-SI is defined.

TLV-SI is control information related to a TLV multiplexing method for multiplexing the IP packet. TLV-SI includes TLV-Network Information Table (NIT), address map table (ANT), and the like, for example.

In transmission using a TLV packet, TLV-NIT is information to associate information of a transmission path such as modulation frequency with a broadcast program. AMT is information to associate a service identifier for identifying a broadcast program number with the IP packet. Note that MMT-SI is control information related to MMT, which is the media transport system. MMT-SI includes information indicating a configuration of the broadcast program or the like.

Non-Patent Document 3: ARIB STD-B60 ver. 1.6, Association of Radio Industries and Businesses As described above, as a broadcasting system of digital terrestrial television broadcasting for the next generation, an advancement by expanding the broadcasting system of the current digital terrestrial television broadcasting has been considered, and a proposal for more flexible operation of the digital television broadcasting has been demanded, along with the expansion.

In particular, in the transmitting side, as the transmission data to be transmitted between broadcasting station and the transmitter station (transmitting station) (inter-stations), a proposal for performing more flexible operation by efficiently transmitting variable-length information such as physical layer control information or emergency warning information has been demanded.

Here, according to the present technology, in order to respond to those demands, information that indicates if there is an existence of variable-length information (hereinafter, also referred to as variable-length information existence information) is included in the transmission data so that a process on the variable-length information such as the physical layer control information and emergency warning information can be efficiently performed. As a result, the operation of the digital television broadcasting can be performed more flexibly.

(Example of Layers)

Figure 4:
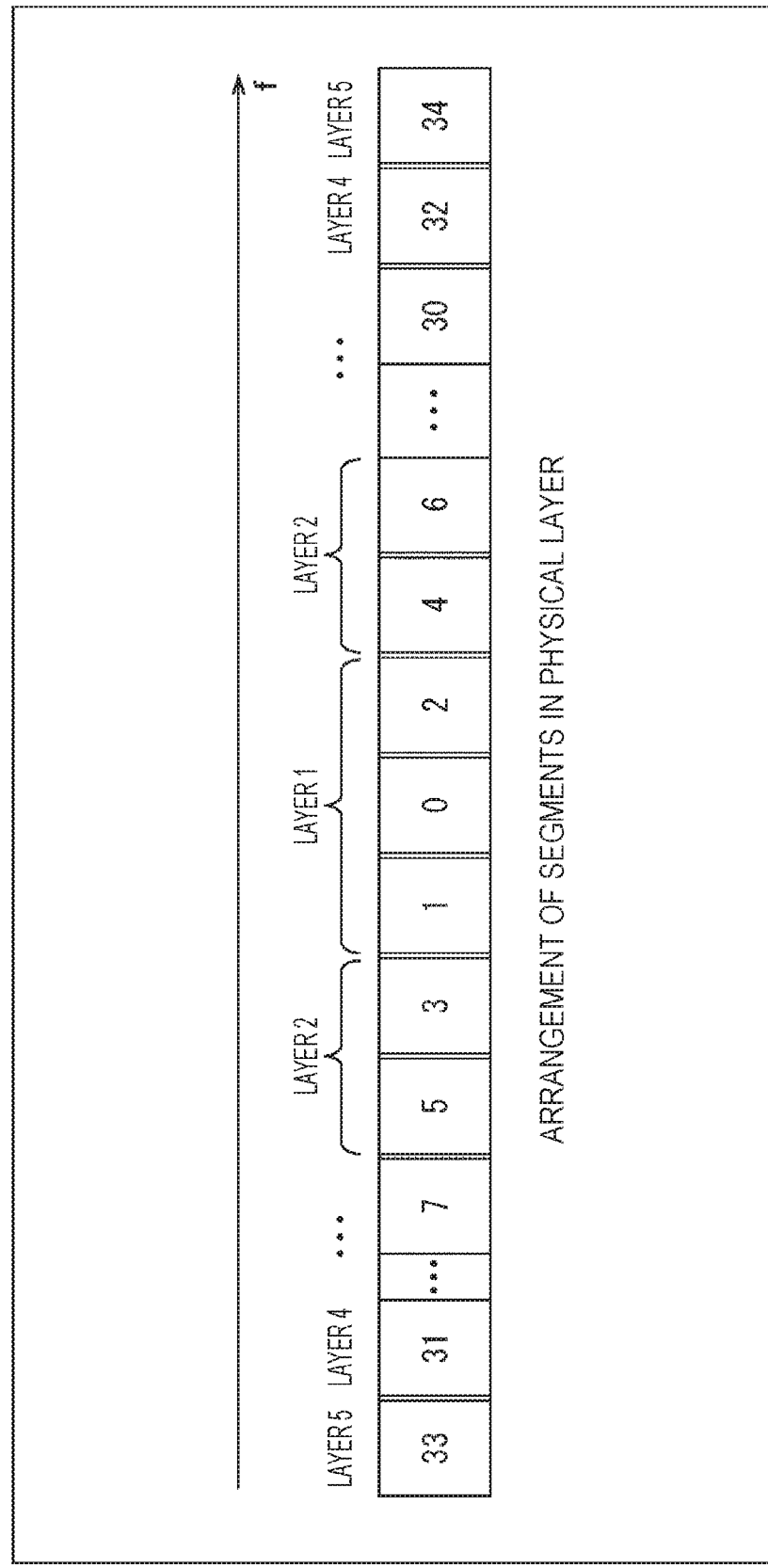
FIG. 4 is a diagram for explaining layers.

FIG. 4 is a diagram for explaining the layers.

FIG. 4 illustrates that, in a case where the frequency division multiplexing (FDM) is employed, the layers include segments, which are drawn as squares in the drawing, as the horizontal direction represents frequency f (MHz).

In other words, in a case where the frequency division multiplexing (FDM) is employed, a predetermined frequency band (for example, 6 MHz) is frequency-divided into a plurality of segments. In FIG. 4, the frequency is divided into 35 segments.

In this case, in the 35 segments, one segment in the middle of the drawing is assumed to be segment #0, the segments in the right and left of the segment #0 are assumed to be segments #1 and #2, the segments further in the right and left of the segments #1 and #2 are assumed to be segments #3 and #4, and, when these assumptions are repeated, one segment in the leftmost in the drawing becomes segment #33 and one segment in the rightmost in the drawing becomes segment #34.

Further, the layers are composed by collecting one or more segments. In FIG. 4, the three segments of the segments #0 to #2 compose Layer 1. Further, the four segments of the segments #3 and #5 and segments #4 and #6 compose Layer 2.

In FIG. 4, although segments #8 to #29 are omitted, a plurality of 24 segments of segments #7 to #30 composes Layer 3, and two segments of segments #31 and #32 compose Layer 4. Then, two segments of segments #33 and #34 compose Layer 5.

In this manner, the layers include one or more segments, which are obtained by frequency division and, for example, data of different service can be transmitted in each of those layers. This arrangement can realize operation that one broadcasting station uses a plurality of segments, for example.

Note that, in the current ISDB-T, the frequency is divided into 13 segments and the number of transmittable layers is three layers at maximum; however, according to the present technology, the numbers of transmittable segments and layers increase and more layers can be used so that greater diversity of service can be provided.

(Structure of Physical Layer Frame)

Figure 5:
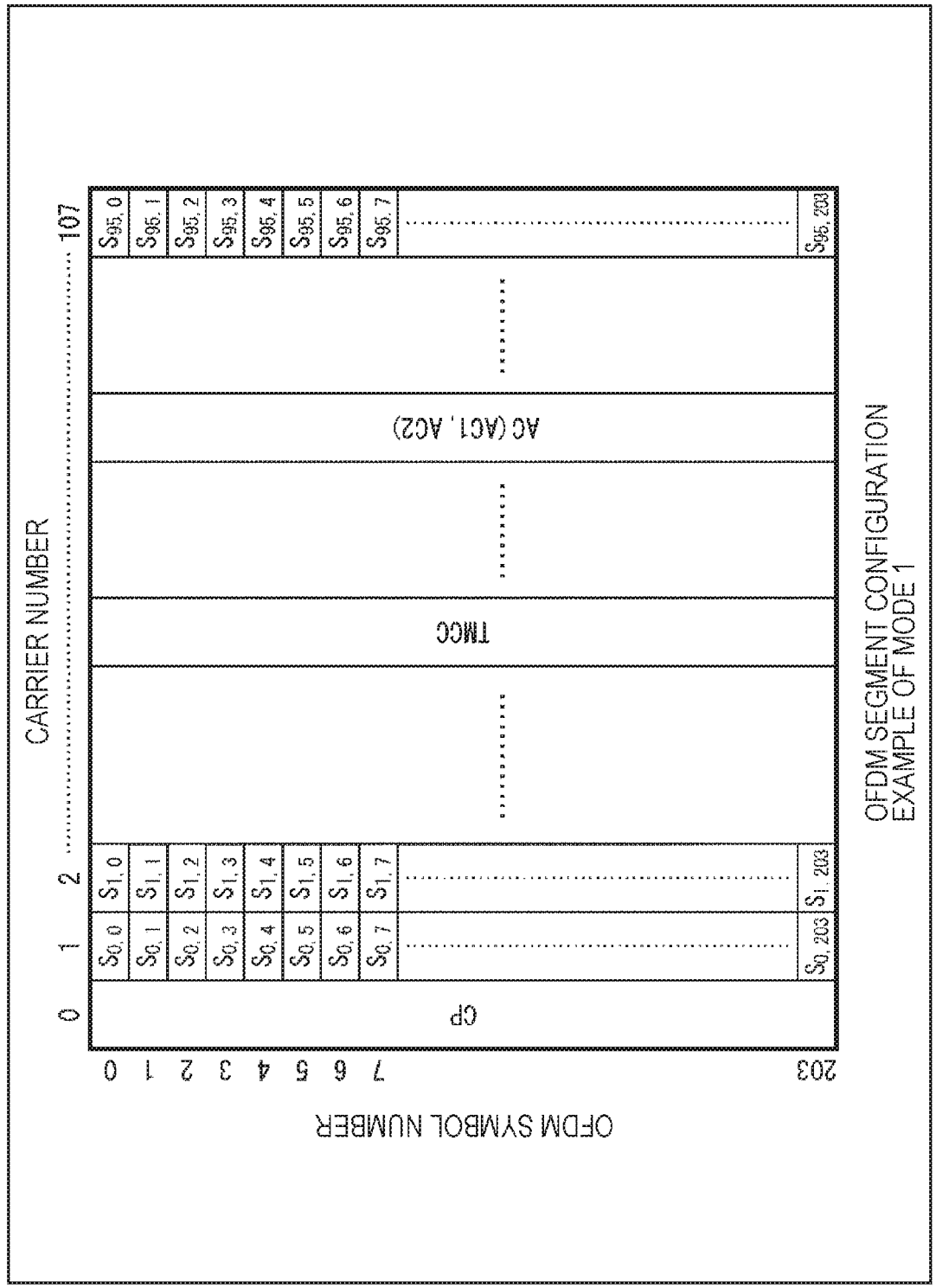
FIG. 5 is a diagram for explaining a structure of a frame of a physical layer and an arrangement of control information.

FIG. 5 is a diagram illustrating structure of a frame of the physical layer and arrangement of the control information.

FIG. 5 illustrates a configuration of an OFDM segment of the current ISDB-T. In FIG. 5, the horizontal direction represents frequency axes indicating numbers of subcarriers (carrier numbers) and the vertical direction represents time axes indicating numbers of OFDM symbols (OFDM symbol numbers).

Here, in ISDB-T, three transmission modes including modes 1, 2, and 3 having different OFDM subcarrier interval are defined. Furthermore, in ISDB-T, as a subcarrier modulation system, four modulation systems including quaternary phase shift keying (QPSK), 16 quadrature amplitude modulation ((DAM), 64-QAM, and differential QPSK (DQPSK) are defined.

FIG. 5 illustrates a configuration of an OFDM segment in a case where the transmission mode is mode 1 and the modulation system is DQPSK. In FIG. 5, 204 OFDM symbols compose one OFDM frame.

In FIG. 5, "$S_{i,j}$" represents a data symbol (carrier symbol) of a subcarrier modulated with data of the upper layer, the OFDM segment is composed by adding each symbol (subcarrier) of continual pilot (CP), which is a pilot signal, a TMCC signal, and an auxiliary channel (AC) signal to the data symbol. Note that the configuration of the OFDM segment of the current. ISDB-T is described in "3.12 Frame configuration" in above described Non-Patent Document 1 or the like.

According to the present technology, as the structure of the physical layer frame, a physical layer frame compatible with an OFDM frame including the OFDM segment illustrated in FIG. 5 or the like may be employed. In other words, in the data processing device 20 in the transmitter station side, the frame generating unit 203 can generate a physical layer frame or the like compatible with the OFDM frame of FIG. 5.

Here, as the structure of the physical layer frame according to the present technology, in a case where a physical layer frame compatible with the OFDM frame illustrated in FIG. 5 is employed, TMCC information according to the present technology is transmitted as the TMCC signal, and AC information including emergency warning information according to the present technology is transmitted as the AC signal.

The TMCC information according to the present technology is length-variable control information (control information of the physical layer). The TMCC information according to the present technology includes a modulation parameter, information indicating a type of data to be transmitted, and the like in each layer. Note that the detail of the TMCC information according to the present technology will be described later with reference to FIGS. 10 to 15.

The AC information is additional information related to broadcasting and includes additional information related to transmission control or emergency warning information, for example. According to the present technology, a case where emergency warning information is transmitted as the AC information will be described. The emergency warning information according to the present technology is variable-length information and includes information indicating content of emergency warning related to disaster such as an earthquake, heavy rain, and the like. Note that details of the emergency warning information according to the present technology will be described later with reference to FIGS. 16 to 22.

(Data Transmission Between Stations)

According to above described Non-Patent Document 2, it is defined that, in advanced wide band digital satellite broadcasting, by transmitting TMCC basic information as an inter-station signal between the broadcasting station in the transmitting side and an uplink station, the uplink station transmits data by using the TMCC basic information. Here, the TMCC basic information is information transmitted from the broadcasting station side to generate TMCC information in the uplink station side.

Figure 6:
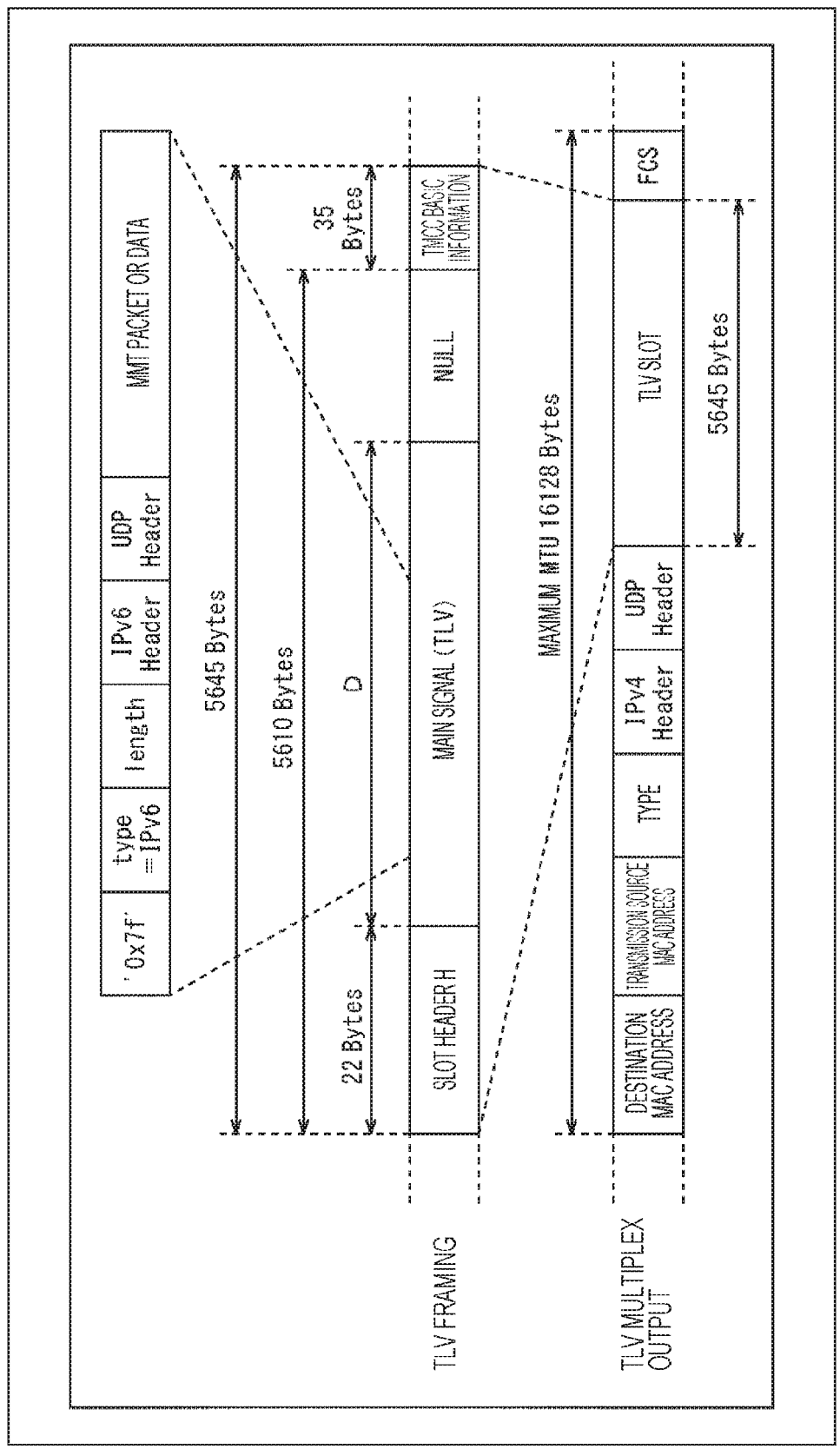
FIG. 6 is a diagram for explaining a transmission scheme of TMCC basic information in advanced wide band digital satellite broadcasting.

FIG. 6 illustrates a transmission scheme of TMCC basic information in the advanced wide band digital satellite broadcasting.

As illustrated in FIG. 6, in the broadcasting station side, a slot header of 22 bytes is added to a TLV packet as a main signal so that TMCC basic information of 35 bytes is added in a case where a TLV frame is formed. Then, in the broadcasting station side, the TLV frame obtained in this manner is encapsulated in an Ethernet (registered trademark) frame formant and transmitted to the uplink station side as a TLV multiplexed output.

With this arrangement, in the uplink station side, TMCC information can be generated by using the TMCC basic information transmitted from the broadcasting station side.

Note that, since details of the TMCC basic information is described in above Non-Patent Document 2, "Chapter 7, Operational Guidelines for Advanced Digital Satellite Broadcasting" in "Appendix 1 Transmission method and configuration of TMCC basic information," description of details thereof will be omitted here.

On the other hand, as described above, also in the digital terrestrial television broadcasting for the next generation, operation for notifying control information (TMCC information) of the physical layer from the broadcasting station side to the transmitter station side is considered.

In other words, for example, in the transmission system 1 of FIG. 1, length-variable TMCC information or the like is transmitted between the data processing device 10 in the broadcasting station side and the data processing device 20 in the transmitter station side (inter-stations); however, according to the present technology, by including the variable-length information existence information indicating a presence or an absence of variable-length information in the transmission data, a process on the variable-length information such as TMCC information can be efficiently performed.

In the following, details of the transmission data according to the present technology will be described.

<3. Format of Transmission Data According to the Present Technology>

(Structure of Transmission Data Between Stations)

FIG. 7 is a diagram illustrating an example of format of the transmission data according to the present technology.

The transmission data according to the present technology is data, which is transmitted between stations, the broadcasting station and transmitter station (transmitting station) and is encapsulated in a frame format of Ethernet (registered trademark).

In FIG. 7, the transmission data according to the present technology includes a destination MAC address, a transmission source MAC address, a protocol type, a protocol subtype, a protocol version, an IPv4 header, a UDP header, a DATA packet, TMCC information, an emergency warning information, and FCS.

The destination MAC address represents a media access control (MAC) address of a destination device of the transmission data. In this case, a MAC address of the data processing device 20 provided in the transmitter station is specified.

The transmission source MAC address represents a MAC address of a device as a transmission source of the transmission data. In this case, a MAC address of the data processing device 10 provided in a facility related to the broadcasting station is specified.

The protocol type represents a type to identify a protocol of the upper layer. In this case, for example, a value defined in institute of Electrical and Electronic Engineers (IEEE) is specified.

The protocol subtype represents a type, which cannot be specified by the protocol type. In this case, for example, information indicating a presence or an absence of variable-length information such as TMCC information and emergency warning information, information indicating a type of data to be transmitted, and the like are specified.

The protocol version represents a version of the variable-length information. This version is incremented by one every time when the variable-length information such as the TMCC information and emergency warning information is updated.

The IPv4 header is a header added to an IP packet of Internet Protocol version 4 (IPv4).

The UDP header is a header added to a UDP packet.

The DATA packet is a packet which stores upper layer control information and a stream of component. The DATA packet is a UDP/IP packet or the like, for example.

The TMCC information is length-variable control information (physical layer control information). In other words, the TMCC information is information transmitted from the data processing device 10 in the broadcasting station side so that TMCC information is obtained in the data processing device 20 in the transmitter station side.

The TMCC information includes a modulation parameter, information indicating a type of data to be transmitted, and the like in each layer. Note that the detail of the TMCC information according to the present technology will be described later with reference to FIGS. 10 to 15.

The emergency warning information is variable-Length information and includes information indicating content of emergency warning related to disaster such as an earthquake, heavy rain, or the like. Note that details of the emergency warning information according to the present technology will be described later with reference to FIGS. 16 to 22.

The frame check sequence (FCS) is a checksum code added to perform an error detection and an error correction of the transmission data. Using the frame check sequence (FCS), the data processing device 20 in the transmitter station side can check whether or not there is an error in the transmission data received from the data processing device 10 in the broadcasting station side.

The transmission data according to the present technology is composed as described above.

(Structure of TLV Packet)

FIG. 8 is a diagram illustrating an example of syntax of the TLV packet included in the transmission data according to the present technology illustrated in FIG. 7. In other words, the transmission data of FIG. 7 can be obtained by encapsulating the TLV packet formed in a format illustrated in FIG. 8 into a frame format of Ethernet (registered trademark).

The 16-bit Protocol_Type indicates a protocol type. In this case, for example, a value defined by IEEE is specified.

The 16-bit Protocol_Subtype indicates a protocol subtype. In this case, in FIG. 9, an example of syntax of Protocol_Subtype is illustrated. Note that the 16 bits of Protocol_Subtype are handled as a bit string.

As illustrated in FIG. 9, in the 16 bits (0 to 15 bits) of Protocol_Subtype, the low order three bits from a least significant bit (LSE) (bit 0 to bit 2) indicate a type of data to be transmitted. As the type of the data, for example, an MPEG2-TS system or a TLV/MMT system is specified.

For example, in a case where a TLV/MMT system is employed as the broadcasting system of the digital terrestrial television broadcasting for the next generation, "001" is specified in the low order three bits (bit 0 to bit 2). Furthermore, in a case where an MPEG2-TS system is employed, "000" is specified in the low order three bits (bit 0 to bit 2).

In this manner, since the type of the data to be transmitted can be specified by the low order three bits (bit 0 to bit 2) in the 16 bits of Protocol_Subtype, various types of data can be transmitted using the TLV/MMT system, MPEG2-TS system, or the like.

Note that the TLV/MMT system and MPEG2-TS system are examples of the types of the data to be transmitted and, in a case where a different type of data is transmitted, the different type of data can be specified by using reserved bits of "2" to "7" ("010" to "111") in the low order three bits (bit 0 to bit 2).

One bit as the fourth bit from the least significant bit (LSB) of the 16 bits (bit 0 to bit 15) of Protocol_Subtype indicates a presence or an absence of DATA packet. For example, in a case where there is a DATA packet, "1" is specified to the one bit and, in a case where there is not a DATA packet, "0" is specified to the one bit.

One bit as the fifth bit from the least significant bit (LSB) of the 16 bits (bit 0 to bit 15) of Protocol_Subtype indicates a presence or an absence of TMCC information. For example, in a case where there is TMCC information, "1" is specified to the one bit and, in a case where there is not TMCC information, "0" is specified to the one bit.

One bit as the sixth bit from the least significant bit (LSB) of the 16 bits (bit 0 to bit 15) of Protocol_Subtype indicates a presence or an absence of emergency warning information. For example, in a case where there is emergency warning information, "1" is specified to the one bit and, in a case where there is not emergency warning information, "0" is specified to the one bit.

Note that high order ten bits (bit 6 to bit 15) from seventh bit to the most significant bit (MS of the 16 bits (bit 0 to bit 15) of Protocol_Subtype are used as a reserved area.

Back to the description of FIG. 8, the 8-bit Protocol_Version indicates a protocol version. Here, for example, the bits are incremented by one every time when the variable-length information such as TMCC information and emergency warning information is updated.

The 16-bit LEN_DATA_Packet indicates a length of a DATA packet. In the DATA_Packet, a length-variable DATA packet corresponding to the length indicated by the LEN_DATA_Packet is provided. For example, as the DATA packet, a UDP/IP packet can be provided.

To the TMCC, TMCC information which is variable-length information is provided. Note that the detail of the TMCC information according to the present technology will be described later with reference to FIGS. 10 to 15.

To the EA_info, emergency warning information, which is variable-length information, is provided. Note that details of the emergency warning information according to the present technology will be described later with reference to FIGS. 16 to 22.

As described above, since a protocol type or a protocol subtype is added to (the TLV packet of) the transmission data according to the present technology, a presence or an absence of the variable-length information such as TMCC information and emergency warning information can be identified in the data processing device 20 in the transmitter station side. Furthermore, since a protocol version is added to (the TLV packet of) the transmission data according to the present technology, an update of the variable-length information such as TMCC information and emergency warning information can be detected in the data processing device 20 in the transmitter station side.

<4. Example of Variable-Length Information According to the Present Technology>

(Example of Syntax of TMCC Information According to the Present Technology)

FIG. 10 is a diagram illustrating an example of syntax of TMCC information according to the present technology. Note that a modulation parameter of each layer will be described with reference to FIGS. 11 to 15 according to need.

The 8-bit LEN_TMCC indicates a length of the TMCC information (TMCC).

The 8-bit LEN_TMCC_Parity indicates a length of parity (TMCC_Parity) of the TMCC information.

Note that the LEN_TMCC_Parity is not needed to be specified in a case where it is specified as fixed value by a subject standard in advance. In other words, in a case where the parity length is not specified as a fixed value by the subject standard as length information related to the TMCC information, the parity length of the TMCC information is specified in addition to the length of the TMCC information, which length is variable.

The 16-bit Parity indicates parity added to LEN_TMCC and LENT_MCC_Parity. With cyclic redundancy check (CRC) using the parity, an error detection of length information related to the TMCC information is performed. In a case where data corruption is detected in the error detection, the target TMCC information is discarded.

The 6-bit NUM_LAYER indicates the number of layers. As the number of layers, for example, 64 layers can be specified at maximum. In a layer loop according to the number of layers specified by the NUM_LAYER, a set of num_segment, layer_fft_size, layer_mod, layer_cod, layer_gi, packet_type is repeatedly provided in each layer.

The 6-bit num_segment indicates the number of segments in a target layer.

The 2-bit layer_fft_size indicates an FFT size of the target layer. As the FFT size, for example, 8K, 16K, 32K, or the like can be specified as illustrated in FIG. 11. Note that 1K represents 1024 points.

The 3-bit layer_mod indicates a carrier modulation system of the target layer. As the carrier modulation system, for example, QPSK, 16QAM, 64QAM-Non Uniform. Constellation (NUC), 256QAM-NUC, 1024QAM-NUC, 4096QAM-NUC, and the like can be specified as illustrated in FIG. 12.

The 3-bit layer_cod indicates a code rate of an error correction of the target layer. As the code rate, for example, ½, ⅔, ¾, ⅚, ⅞, and the like can be specified as illustrated in FIG. 13.

The 3-bit layer_gi indicates a guard interval of the target layer. As the guard interval, for example, ¼, ⅛, 1/16, 1/32, and the like can be specified as illustrated in FIG. 14. Note that,
for example, "¼" indicates that the GI length is a quarter of a symbol-length (effective symbol length) of the OFDM symbol.

The 3-bit packet_type indicates a type of data to be transmitted in the target layer. As the data type, for example, MPEG2-TS system or TLV/MMT system is specified as illustrated in FIG. 15.

For example, as a broadcasting system of the digital terrestrial television broadcasting for the next generation, in a case where the TLV/MMT system is employed, "1" is specified as packet_type. Furthermore, when the MPEG2-TS system is employed, "0" is specified as packet_type.

In this manner, since a type of data to be transmitted can be specified by packet_type, various types of data such as the TLV/MMT system and MPEG2-TS system can be transmitted for each layer.

Note that the TLV/MMT system and MPEG2-TS system are examples of types of data to be transmitted and, in a case where a different type of data is transmitted, the different types of data can be specified by using reserved bits "2" to "7."

The above description is assumed to be the field in the layer loop.

The TMCC_Parity indicates parity added to the TMCC information. The error detection of the TMCC information is performed by the cyclic redundancy check (CRC) using the parity. Note that the parity includes a parity length specified by LEN_TMCC_Parity. Here, the parity length may be set as a fixed length specified by a subject standard in advance.

Note that, in FIG. 10, in a case where unsigned integer most significant bit first (uimsbf) is specified as Mnemonic, it is indicated that bit operation is performed and it is handled as an integral number. Furthermore, in a case where bit string, left bit first (bslbf) is specified, it is handled as a bit string. It is assumed that these are similar in later described FIG. 16.

In the above, as an example of variable-length information according to the present technology, TMCC information has been explained.

(Example of Syntax of Emergency Warning Information According to the Present Technology)

FIG. 16 is a diagram illustrating an example of syntax of emergency warning information according to the present technology. Note that a disaster class code and an area code of each message and the like will be described with reference to FIGS. 17 to 22 according to need.

The 8-bit LEN_EA_info indicates a length of emergency warning information (EA_info).

The 8-bit LEN_EA_Parity indicates a length of parity (ESA_Parity) of the emergency warning information.

Note that, in a case where LEN_EA_Parity is specified as a fixed value by a subject standard in advance, it is not needed to be specified. In other words, in a case where parity length is not specified as a fixed value by the subject standard as length information related to the emergency warning information, a parity length of the emergency warning information is specified in addition to the length of emergency warning information, which length is variable.

The 16-bit Parity indicates parity added to LEN_EA_info and LEN_EA_Parity. An error detection of length information related to emergency warning information is performed with the cyclic redundancy check (CRC) using the parity. In a case where a data corruption is detected in the error detection, the target emergency warning information is discarded.

The 1-bit EA_EXIST_FLAG is a flag, which indicates whether there is information of a stage subsequent to EA_EXIST_FLAG in the emergency warning information.

In a case where EA_EXIST_FLAG indicates that there is information of a subsequent stage, a version and NUM_EA_MESSAGE are respectively provided subsequent to EA_EXIST_FLAG.

The 8-bit version indicates a version of the emergency warning information. The version is incremented by one every time when the emergency warning information is updated, for example.

NUM_EA_MESSAGE indicates the number of disaster class codes. In an EA message loop corresponding to the number of disaster class codes specified by NUM_EA_MESSAGE, a set of EA_code, EA_status, location_type, location_length, and location_code is repeatedly provided.

The 8-bit EA_code indicates a disaster class code. For example, as illustrated in FIG. 17, by associating EA_code with EA_message data (emergency warning information), which indicates content of the emergency warning, a message expressing various warning can be notified. Note that, for example, the table illustrated in FIG. 17 is transmitted as being included in the broadcast signal from the data processing device 20 and received and stored by the receiving device 30.

The 2-bit EA_status indicates a state of the emergency warning. As the state of the emergency warning, for example, as illustrated in FIG. 18, "emergency warning starts," "emergency warning is ongoing," or "emergency warning has ended" is specified.

The 3-bit location_type indicates a type of the area code. The location_length indicates a length (size) of the area code. The location_code indicates the area code.

FIG. 19 is a diagram illustrating an example of a type of the area code.

In a case where "0" is specified as location_type, it is indicated that the target of the warning is nationwide. In a case where the location_type is "0," location_length and location_code are not subsequently provided (or, in a case where location_length and location_code are provided, they are ignored in the receiving device 30).

In a case where "1" is specified as location_type, it is indicated that the location_code represents an area with a predetermined code, which is a prefecture code defined in JIS X0401, for example. A correspondence relation between the prefecture codes and prefectures indicated by the prefecture codes can be preset in the receiving device 30, for example.

Note that the prefecture code defined in JIS X0401 expressed in 8 bits. Thus, in a case where location_type is "1," the size of location_code is fixed to 8 bits.

As described above, in a case where the location_type is "1," since the size of the location_code is uniquely set to 8 bits and does not change, the emergency warning information (FIG. 16) does not need to include location_length, which indicates the size of location_code.

In a case where "2" is specified as location_type, it is indicated that the location_code represents areas by using a postal code.

The postal code is a decimal number of seven digits and, in a case where the location_code indicates an area with a postal code, a value that expresses the decimal number of the entire or part of the postal code in binary coded decimal (BCD) is set to the location_code.

Here, with the BCD, each digit of the decimal number is expressed in four bits. Furthermore, in a case where the area is expressed by using all seven digits of the postal code, the size of location_code becomes maximum. Thus, the maximum size of location_code, which expresses an area by using a postal code becomes 28 bits=seven digits×four bits.

The maximum number of digits of a value indicated by location_code, which expresses an area by using the postal code is the seven digits of the postal code and three bits, a minimum bit length to express seven which is the number of the digits, are allocated as location_length. The 3-bit location_length is set as a value, which indicates the number of digits of a decimal number as an entire or a part of the postal code indicated by location_code.

In a case where "3" is specified as location_type, location_code indicates that an area is expressed by using latitude and longitude.

In this case, to location_code, for example, latitude and longitude of two locations are set and this location_code indicates an area of a rectangle having a line connecting the two locations as a diagonal. As latitude and longitude, for example, a nine-digit decimal number including a three-digit integral number part and a six-digit decimal part can be employed at maximum.

To the location_code, a numerical value that expresses a decimal number as latitude and longitude in BCD is set. Here, latitude and longitude are respectively expressed in a 9-digit decimal number at maximum and, thus, a maximum size of location_code in which a numerical value expressed in BCD is set becomes 144 bits=((9 digits×4 bits)+(9 digits×4 bit))×2 locations.

Furthermore, four bits, a minimum bit length to express nine which is the maximum number of digits of the decimal number as each of the latitude and longitude are allocated to location_length. The 4-bit location_length is set as a value, which indicates the number of digits of the decimal number as each of the latitude and longitude set to location_code.

The location_type having a value from "4" to "7," is reserved for future use.

FIG. 20 is a diagram illustrating a correspondence relation between the prefecture code defined in JIS X0401 and prefectures indicated by the prefecture codes.

By presetting the correspondence relation between the prefecture codes and the prefectures illustrated in FIG. 20 in the receiving device 30, the receiving device 30 can recognize the area (a prefecture) indicated by the prefecture code.

Figure 21:
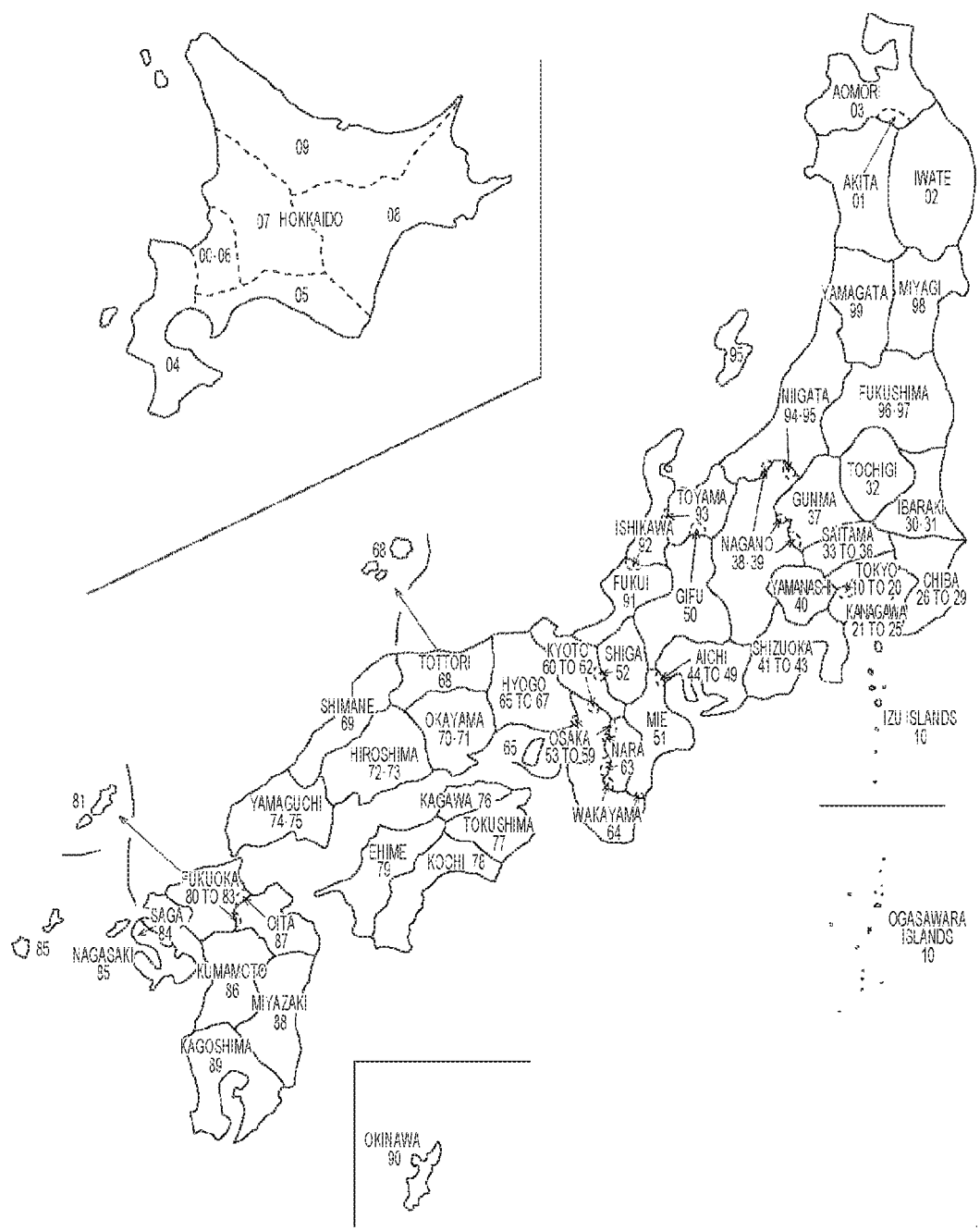
FIG. 21 is a diagram illustrating expressions of areas using postal codes.

FIG. 21 is a diagram for explaining an area expression using the postal codes.

The seven-digit postal codes are set to town areas and skyscrapers.

The high order two digits of the seven-digit postal codes indicate prefectures as illustrated in FIG. 21. Furthermore, the high order three digits or the high order five digits of the seven-digit postal code indicate a post office that manages the area. Since the area managed by the post office is determined, it can be understood that the high order three digits or the high order five digits of the postal code indicate an area managed by the post office indicated by the high order three digits or the high order five digits.

In a case where the high order three digits of the postal code indicate a post office that manages the area, the remaining low order four digits indicate a town area number of a town area (or a skyscraper). Furthermore, in a case where the high order five digits of the postal code indicate a post office that manages the area, the remaining lower order two digits indicate a town area number.

For example, regarding the seven-digit postal codes, the seven-digit postal code, high order two digits, high order three digits, or high order five digits can be used as the location_code.

Figure 22:
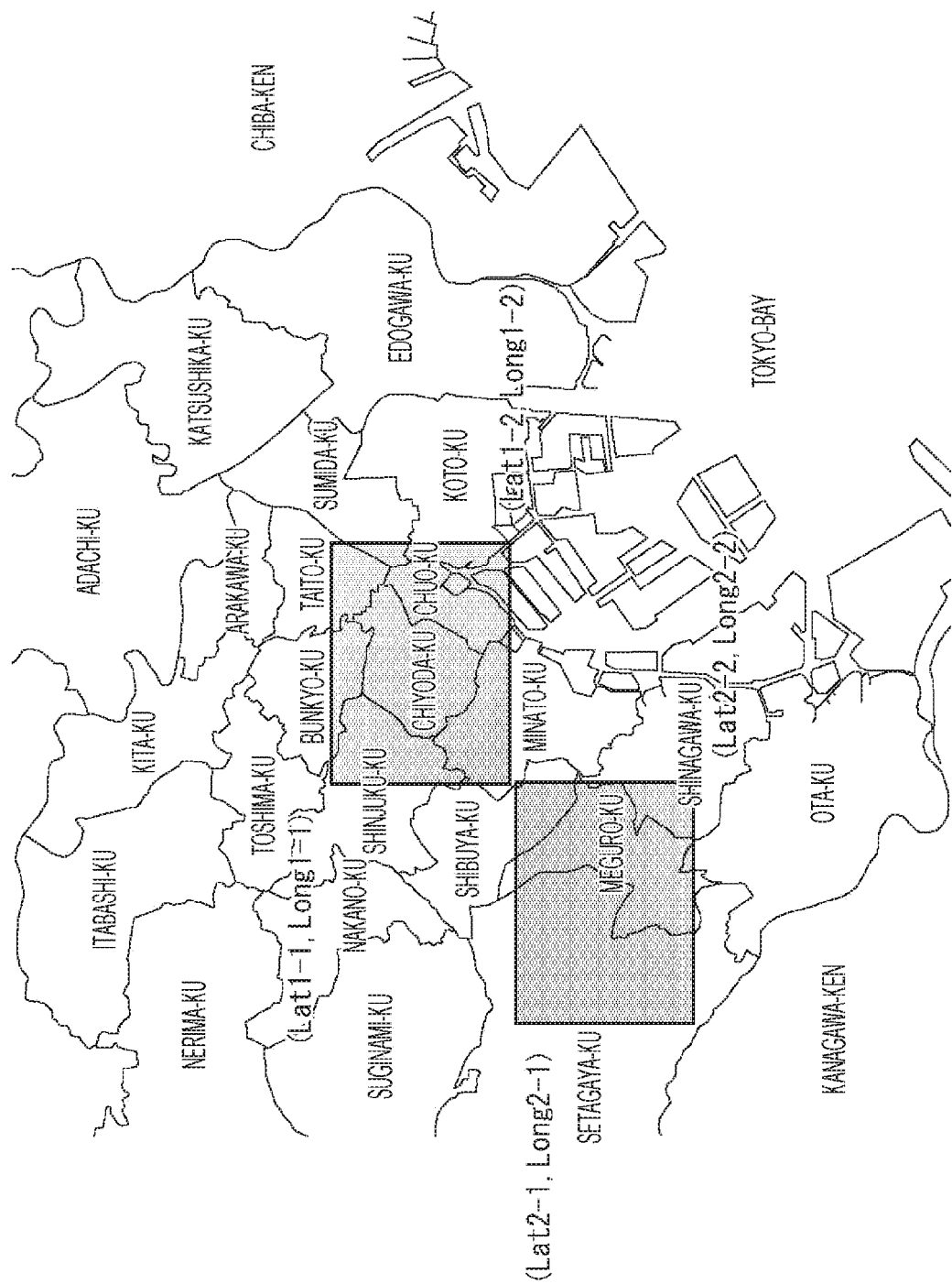
FIG. 22 is a diagram illustrating expressions of areas using latitude and longitude.

FIG. 22 is a diagram for explaining an expression of areas using latitude and longitude.

In a case where an area is expressed by using latitude and longitude, latitude and longitude of two locations are set to the location_code. The location_code indicates a rectangular area having, as a diagonal, a line connecting the two locations whose latitude and longitude are set to the location_code.

As described above, as the location_code, the prefecture code defined in JIS X0401, postal code, latitude and longitude, or the like can be used according to the location_type, and, with this configuration, a relatively large area such as a prefecture and a local area, and a relatively small area such as a town and a city, or an area having an arbitrary size can be specified according to need.

Back to the explanation of FIG. 16, the above description is assumed to be a field in the EA message loop.

EA_Parity indicates parity added to emergency warning information. By cyclic redundancy check (CRC) using the parity, an error detection of emergency warning information is performed. Note that the parity is composed in a parity length specified by LEN_EA_Parity. Here, the parity length may be set as a fixed length specified by a subject standard in advance.

The above description has explained the emergency warning information as an example of the variable-length information according to the present technology.

Note that, in the above description, as the variable-length information according to the present technology, the TMCC information as physical layer control information and the emergency warning information transmitted as AC information have been explained; however, another type of variable-length information may be used. Then, in a case where another type of variable-length information is encapsulated into a frame format of Ethernet (registered trademark) illustrated in FIG. 7, a presence or an absence of the other type of variable-length information is specified by the protocol subtype, and a presence or an absence of an update of the other type of variable-length information is specified by the protocol version.

<5. Flow of Data Transmission Process Between Stations According to the Present Technology>

Next, with reference to the flowchart of FIG. 23, a flow of an inter-station data transmission process between the data processing device 10 in the broadcasting station side and the data processing device 20 in the transmitter station side, will be described.

Figure 23:
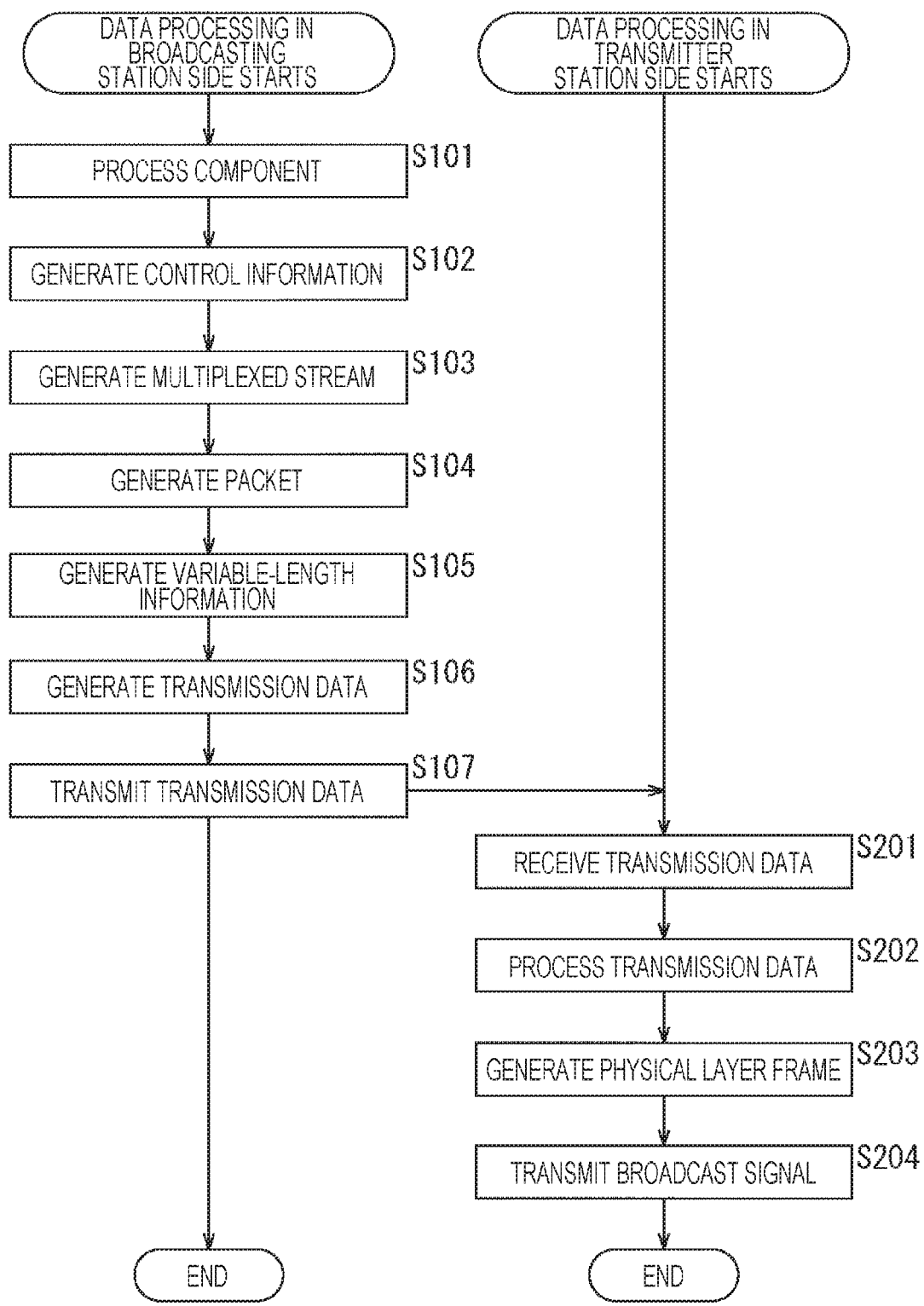
FIG. 23 is a flowchart for explaining a flow of data transmission process between stations according to the present technology.

Note that, in FIG. 23, the processes in steps S101 to S107 are executed by the data processing device 10 in the broadcasting station side, and the processes in steps S201 to S204 are executed by the data processing device 20 in the transmitter station side.

In step S101, the component processing unit 101 performs a process such as an encoding process on data of components of video, audio, and captions and supplies the data obtained as a result to the multiplexer 103.

In step S102, the control information generating unit 102 generates a control signal of the upper layer and supplies the signal to the multiplexer 103. Here, for example, in a case where the TLV/MMT system is employed, TLV-SI is generated as a control signal of the upper layer.

In step S103, the multiplexer 103 multiplexes a stream of the component obtained in the process in step S101 and a stream of the control signal of the upper layer obtained in the process in step S102 and supplies the multiplexed stream obtained as a result to the packet generating unit 104.

In step S104, the packet generating unit 104 processes the multiplexed stream obtained in the process in step S103 and generates a packet in a predetermined format. In this case, for example, a UDP/IP packet storing the data obtained from the multiplexed stream in its payload is generated and supplied to the data processing unit 106.

In step S105, the variable length information generating unit 105 generates variable-length information and supplies the variable-length information to the data processing unit 106. In this case, for example, as the variable-length information, TMCC information and emergency warning information as control information of the physical layer is generated.

In step S106, the data processing unit 106 generates transmission data formed in a predetermined frame format by processing the packet in a predetermined format obtained in the process in step S104 and the variable-length information obtained in the process in step S105 and supplies the transmission data to the transmitting unit 107.

In this case, for example, since the UDP/IP packet is obtained in the process in step S104 and the TMCC information and emergency warning information are obtained in the process in step S105, transmission data according to the present technology is generated by generating a TLV packet in a format illustrated in FIG. 8 and encapsulating the TLV packet into a frame format of Ethernet (registered trademark) illustrated in FIG. 7.

In other words, to the transmission data, a protocol subtype for identifying a presence or an absence the TMCC information and emergency warning information and a protocol version for detecting an update of the TMCC information and emergency warning information is added.

In step S107, the transmitting unit 107 transmits the transmission data obtained in the process in step S106 to the data processing device 20 in the transmitter station side via the communication line 40.

The above described processes are performed by the data processing device 10 in the broadcasting station side. On the other hand, in the data processing device 20 in the transmitter station side, following processes are performed.

In step S201, the receiving unit 201 receives transmission data transmitted from the data processing device 10 in the broadcasting station side and supplies the transmission data to the data processing unit 202.

In step S202, the data processing unit 202 processes the transmission data obtained in the process in step S201 and extracts a packet in a predetermined format and the variable-length information. In this case, for example, a TLV packet is extracted as the packet in the predetermined format and TMCC information and emergency warning information, which are control information of the physical layer, are extracted as the variable-length information.

In this case, since a protocol subtype is added to (the TLV packet of) the transmission data, the data processing unit 202 identifies a presence or an absence of the variable-length information such as the TMCC information and emergency warning information and can perform a process according to the recognition result. For example, according to an analysis result of the protocol subtype, only in a case where there is TMCC information or emergency warning information in the transmission data, the data processing unit 202 can perform a process related to the TMCC information or emergency warning information.

Furthermore, since a protocol version is added to (the TLV packet of) the transmission data, the data processing unit 202 detects an update of the variable-length information such as the TMCC information and emergency warning information, and can perform a process according to the detection result. For example, according to the analysis result of the protocol version, the data processing unit 202 can obtain only the TMCC information and emergency warning information in which the version is updated and ignore the TMCC information and emergency warning information which are not updated.

The data processing unit 202 supplies variable-length information (TMCC information or emergency warning information) to the frame generating unit 203 together with the packet in a predetermined format (TLV packet) obtained in the process in step S202.

In step S203, the frame generating unit 203 generates a physical layer frame by processing the packet in the predetermined packet and variable-length information obtained in the process in step S202 and supplies the physical layer frame to the transmitting unit 204.

In this case, in the process in step S202, since the TLV packet and the TMCC information or emergency warning information are obtained, the physical layer frame composed as illustrated in FIG. 5, for example, can be generated. Here, for example, in a case where the emergency warning information is not obtained as variable-length information from the transmission data, it is not needed to include the emergency warning information to the physical layer frame.

In step S204, the transmitting unit 204 performs a necessary process (for example, an IFFT calculation process or the like) according to the TMCC information or the like on the physical layer frame obtained in the process in step S203 and transmits a broadcast signal obtained as a result from the transmitting antenna provided in the transmitter station by frequency division multiplexing (FDM).

With this configuration, in the transmission system 1 of FIG. 1, in the receiving device 30, the broadcast signal transmitted from the data processing device 20 in the transmitter station side is received via the broadcast transmission line 50 and a broadcast program according to a channel selection operation by the end user is reproduced.

In the above description, the flow of the data transmission process between the stations according to the present technology has been explained.

<6. Modification Example>

(Application to Another Broadcasting Standard)

In the above description, as the digital television broadcasting standards, Integrated Services Digital Broadcasting (ISDB), which is a system employed in Japan or the like, has been explained; however, the present technology may be applied to Advanced Television Systems Committee (ATSC), which is a system employed in the United States of America and the like, Digital Video Broadcasting (DVB), which is a system employed in countries in Europe and the like, for example.

In other words, in ATSC or DVB, as a system for multiplexing broadcast signals, not frequency division multiplexing (FDM) but time division multiplexing (TDM) is employed and, the present technology can also be employed even in a case where time division multiplexing (TDM) is employed. Furthermore, the above described layers may be conceptually understood as physical layer pipe (PLP). In this case, the plurality of layers may be multiple-PLP (M-PLP).

Furthermore, as the digital television broadcasting standard, in addition to terrestrial broadcast, the present technology may also be applied to standard of satellite broadcasting using broadcasting satellite (BS), communications satellite (CS), and the like, wire broadcasting such as cable television (CATV), and the like.

(Another Example of Packet and Control Information)

Furthermore, the names of the above described packet, frame, control information, and the like are examples and other names may be used. Here, the difference of the names is formal difference and substantive content of the subject packet, frame, control information, and the like is not different.

For example, a TLV packet may sometimes represent an ATSC link-layer protocol (ALP) packet, Generic packet, or the like. Furthermore, the frame and packet may be used in the same meaning. Furthermore, in the above description, an IP packet of Internet Protocol version 4 (IPv4) has been explained; however, an IP packet of Internet Protocol version 6 (IPv6) may be used.

(Application to Another Standard)

Furthermore, as a transmission path, the present technology may also be applied to a transmission path other than the broadcast transmission line 50, which is a predetermined standard and the like assuming to use a communication transmission path (communication line) such as the Internet, a telephone network, and the like, for example (a standard other than the digital television broadcasting standard). In such a case, as the transmission path of the transmission system 1 (FIG. 1), the communication transmission path such as the Internet and telephone network may be used and the data processing device 20 may be a communication server provided on the Internet. Then, the communication server and receiving device 30 perform communication in both directions via the communication transmission path.

<7. Configuration of Computer>

Figure 24:
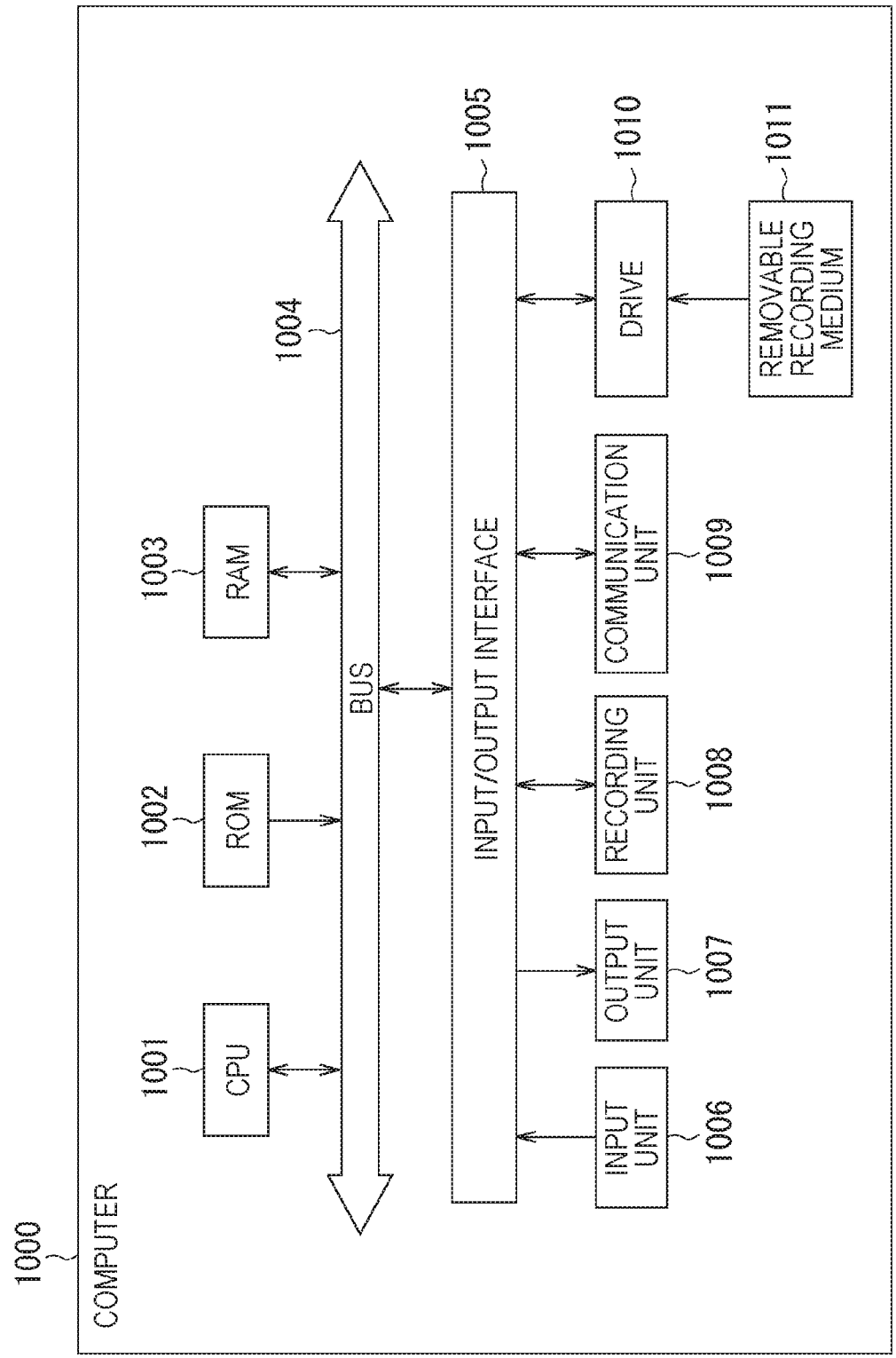
FIG. 24 is a diagram illustrating a configuration example of a computer.

The above described series of processes (data transmission process between the stations according to the present technology) may be executed by hardware or may be executed by software. In a case where the series of processes are executed by software, a program composing the software is installed in the computer. FIG. 24 is a diagram illustrating a configuration example of hardware of the computer executing the above described series of processes according to a program.

In a computer 1000, a central processing unit (CPU) 1001, a read only memory (ROM) 1002, and a random access memory (RAM) 1003 are connected to one another via a bus 1004. To the bus 1004, an input/output interface 1005 is also connected. To the input/output interface 1005, an input unit 1006, an output unit 1007, a recording unit 1008, a communication unit 1009, and a drive 1010 are connected.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface, and the like. The drive 1010 drives a removable recording medium 1011 such as a magnetic disk, an optical disk, a magnetic optical disk, semiconductor memory, or the like.

In the computer 1000 composed as described above, the above described series of processes are executed using the CPU 1001 by loading a program recorded in the ROM 1002 and recording unit 1008 to the RAM 1003 via the input/output interface 1005 and bus 1004 and executing the program.

The program executed by the computer 1000 (CPU 1001), for example, may be recorded and provided in the removable recording medium 1011 as a portable medium or the like. Furthermore, the program may be provided via a wired or wireless transmission medium such as a local area network, the Internet, and digital satellite broadcasting.

In the computer 1000, the program can be installed to the recording unit 1008 via the input/output interface 1005 by attaching the removable recording medium 1011 to the drive 1010. Furthermore, the program can be received in the communication unit 1009 via the wired or wireless transmission medium and installed to the recording unit 1008. In addition, the program may be installed in the ROM 1002 or recording unit 1008 in advance.

Here, in this specification, the processes that the computer executes according to the program do not need to be always executed in chronological order according to the order described in the flowchart. In other words, the processes that the computer executes according to the program include processes executed in parallel or independently (for example, parallel processing or processing by an object). Furthermore, the program may be processed by a single computer (processor) or may be distributed and processed by a plurality of computers.

Note that the embodiment according to the present technology is not limited to the above described embodiment and various changes can be made within the scope of the present technology.

Furthermore, the present technology may have following configurations.

(1)

A data processing device includes a processing unit configured to process a stream including first control information, a component, and variable-length information and add variable-length information existence information indicating a presence or an absence of the variable-length information, and a transmitting unit configured to transmit the processed stream as transmission data to another data processing device via a communication line.

(2)

In the data processing device according to (1), the variable-length information is information of at least one of second control information or emergency warning information.

(3)

In the data processing device according to (2), the processing unit processes the stream and adds version information indicating a version of the variable-length information.

(4)

In the data processing device according to (2) or (3), the processing unit processes the stream and adds data type information indicating a type of data of the stream.

(5)

In the data processing device according to any one of (2) to (4), the another data processing device transmits the stream obtained from the transmission data as a broadcast signal by frequency division multiplexing (FDM).

(6)

In the data processing device according to (5), the first control information is control information of an upper layer, which is an upper layer of a physical layer, the second control information is control information of the physical layer, and the second control information includes a modulation parameter of each layer and data type information indicating a type of data of the stream, for each layer including one or more segments.

(7)

In the data processing device according to (5) or (6), the emergency warning information includes at least information related to content of emergency warning and information related to a target area of the emergency warning, for each message of the emergency warning.

(8)

In the data processing device according to any one of (1) to (7), the data processing device is placed in a facility related to a broadcasting station, the another data processing device is placed in a transmitter station, and the data processing device transmits the transmission data to the another data processing device via an exclusive line.

(9)

In the data processing device according to (8), the first control information and the component are stored in an Internet Protocol (IP) packet including a User Datagram Protocol (UDP) packet, the IP packet and the variable-length information are stored in a type length value (TLV) packet, and the transmission data is transmitted in an Ethernet (registered trademark) frame format.

(10)

In a data processing method of a data processing device, the method includes the steps, by the data processing device, of processing a stream including first control information, a component, and variable-length information, and adding variable-length information existence information indicating a presence or an absence of the variable-length information, and transmitting the processed stream, as transmission data, to another data processing device via a communication line.

(11)

A data processing device includes a receiving unit configured to receive transmission data transmitted from another data processing device via a communication line, and a processing unit configured to process the transmission data.

The transmission data is data obtained by processing a stream including first control information, a component, and variable-length information, and adding variable-length information existence information indicating a presence or an absence of the variable-length information, and the processing unit processes the transmission data on the basis of the variable-length information existence information.

(12)

In the data processing device according to (11), the variable-length information is information of at least one of second control information or emergency warning information.

(13)

In The data processing device according to (12), the transmission data includes version information indicating a version of the variable-length information, and the processing unit processes the variable-length information on the basis of the version information.

(14)

In the data processing device according to (12) or (13), the transmission data includes data type information indicating a type of data of the stream, and the processing unit processes the stream on the basis of the data type information.

(15)

The data processing device according to any one of (12) to (14) further includes a transmitting unit configured to transmit the stream obtained from the transmission data as a broadcast signal by frequency division multiplexing (FDM).

(16)

In the data processing device according to (15), the first control information is control information of an upper layer, which is an upper layer of a physical layer, the second control information is control information of the physical layer, and the second control information includes a modulation parameter of each layer and data type information indicating a type of data of the stream, for each layer including one or more segments.

(17)

In the data processing device according to (15) or (16)

the emergency warning information includes at least information related to content of emergency warning and information related to a target area of the emergency warning, in each message of the emergency warning.

(18)

In the data processing device according to any one of (11) to (17), the another data processing device is placed in a facility related to a broadcasting station, the data processing device is placed in a transmitter station, and the data processing device receives the transmission data transmitted from the another data processing device via an exclusive line.

(19)

In the data processing device according to (18), the first control information and component are stored in an IP packet including a UDP packet, the IP packet and the variable-length information are stored in a TLV packet, and the transmission data is transmitted in an Ethernet (registered trademark) frame format, (20)

In a data processing method of data processing device, the method includes steps, by the data processing device, of receiving transmission data transmitted from another data processing device via a communication line, processing the transmission data, the transmission data being obtained by processing a stream including first control information, a component, and variable-length information and adding variable-length information existence information indicating a presence or an absence of the variable-length information; and processing the transmission data on the basis of the variable-length information existence information.

REFERENCE SIGNS LIST

1 Transmission system
10, 10-1 to 10-N Data processing device
20 Data processing device
30, 30-1 to 30-M Receiving device
40, 40-1 to 40-N Communication line
50 Broadcast transmission line
100 Control unit
101 Component processing unit
102 Control information generating unit
103 Multiplexer
104 Packet generating unit
105 Variable length information generating unit
106 Data processing unit
107 Transmitting unit
200 Control unit
201 Receiving unit
202 Data processing unit
203 Frame generating unit
204 Transmitting unit
1000 Computer
1001 CPU

The invention claimed is:

1. A data processing device, comprising:
processing circuitry configured to
receive a stream including first control information and a component, and
generate transmission data including the stream, variable-length information, and variable-length information existence information, the variable-length information existence information indicating presence of the variable-length information in the transmission data; and
transmitting circuitry configured to transmit the transmission data to another data processing device via a communication line,
wherein
the variable-length information includes at least one of second control information or emergency warning information,
the first control information is control information of an upper layer in a protocol stack above a physical layer in the protocol stack,
the second control information is control information of the physical layer, and
the another data processing device is configured to transmit the stream obtained from the transmission data as a broadcast signal by frequency division multiplexing (FDM) according to the variable-length information.

2. The data processing device according to claim 1, wherein transmission data further includes version information indicating a version of the variable length information.

3. The data processing device according to claim 1, wherein transmission data further includes data type information indicating a type of data of the stream.

4. The data processing device according to claim 1, wherein the second control information includes, for each layer of layered transmission specified in the second control information, a modulation parameter and data type information indicating a type of data to be transmitted in a corresponding layer, each layer of the layered transmission including one or more frequency segments.

5. The data processing device according to claim 1, wherein the emergency warning information includes, for each message of emergency warning specified in the emergency warning information, at least information related to content of emergency warning and information related to a target area of the emergency warning.

6. The data processing device according to claim 1, wherein
the data processing device is placed in a facility related to a broadcasting station,
the another data processing device is placed in a transmitter station, and
the communication line used by the data processing device to transmit the transmission data to the another data processing device is an exclusive line.

7. The data processing device according to claim 6, wherein the first control information and the component are stored in an Internet Protocol (IP) packet including a User Datagram Protocol (UDP) packet,
the IP packet and the variable-length information are stored in a type length value (TLV) packet, and
the transmission data is transmitted in an Ethernet (registered trademark) frame format.

8. A data processing method of a data processing device, the method comprising:
receiving a stream including first control information and a component;
generating, by processing circuitry of the data processing device, transmission data including the stream, variable-length information, and variable-length information existence information, the variable-length information existence information indicating presence of the variable-length information in the transmission data; and
transmitting, by transmission circuitry of the data processing device, the transmission data to another data processing device via a communication line,
wherein
the variable-length information includes at least one of second control information or emergency warning information,
the first control information is control information of an upper layer in a protocol stack above a physical layer in the protocol stack,
the second control information is control information of the physical layer, and
the another data processing device is configured to transmit the stream obtained from the transmission data as a broadcast signal by frequency division multiplexing (FDM) according to the variable-length information.

9. A data processing device, comprising:
receiving circuitry configured to receive transmission data from another data processing device via a communication line, the transmission data including a stream, variable-length information, and variable-length information existence information, the variable-length information existence information indicating presence of the variable-length information in the transmission data;
processing circuitry configured to
obtain the stream from the transmission data, the stream including first control information and a component, and
obtain the variable-length information from the transmission data on the basis of the variable-length information existence information; and
transmitting circuitry configured to transmit the stream obtained from the transmission data as a broadcast signal by frequency division multiplexing (FDM) according to the variable-length information,
wherein
the variable-length information includes at least one of second control information or emergency warning information,
the first control information is control information of an upper layer in a protocol stack above a physical layer in the protocol stack, and
the second control information is control information of the physical layer.

10. The data processing device according to claim 9, wherein
the transmission data further includes version information indicating a version of the variable-length information, and
the processing circuitry is configured to process the variable-length information on the basis of the version information.

11. The data processing device according to claim 9, wherein
the transmission data further includes data type information indicating a type of data of the stream, and
the processing circuitry is configured to process the stream on the basis of the data type information.

12. The data processing device according to claim 9, wherein the second control information includes, for each layer of layered transmission specified in the second control information, a modulation parameter and data type information indicating a type of data to be transmitted in a corresponding layer, each layer of the layered transmission including one or more frequency segments.

13. The data processing device according to claim 9, wherein the emergency warning information includes, for each message of emergency warning specified in the emergency warning information, at least information related to content of emergency warning and information related to a target area of the emergency warning.

14. The data processing device according to claim 9, wherein
the another data processing device is placed in a facility related to a broadcasting station,
the data processing device is placed in a transmitter station, and
the communication line used by the data processing device to receive the transmission data transmitted from the another data processing device is an exclusive line.

15. The data processing device according to claim 14, wherein
the first control information and component are stored in an IP packet including a UDP packet,
the IP packet and the variable-length information are stored in a TLV packet, and
the transmission data is transmitted in an Ethernet (registered trademark) frame format.

16. A data processing method of a data processing device, the method comprising:
receiving transmission data from another data processing device via a communication line, the transmission data including a stream, variable-length information, and variable-length information existence information, the variable-length information existence information indicating presence of the variable-length information in the transmission data;
obtaining, by processing circuitry of the data processing device, the stream from the transmission data, the stream including first control information and a component;
obtaining, by the processing circuitry of the data processing device, the variable-length information from the transmission data on the basis of the variable-length information existence information;
transmitting, by transmitting circuitry of the data processing device, the stream obtained from the transmission data as a broadcast signal by frequency division multiplexing (FDM) according to the variable-length information,
wherein
the variable-length information includes at least one of second control information or emergency warning information, the first control information is control information of an upper layer in a protocol stack above a physical layer in the protocol stack, and the second control information is control information of the physical layer.

* * * * *